(12) United States Patent
Hakamada et al.

(10) Patent No.: US 7,060,123 B2
(45) Date of Patent: Jun. 13, 2006

(54) FLUORESCENT INK, AND INK CARTRIDGE RECORDING UNIT, INK-JET RECORDING METHOD, AND INK-JET RECORDING APPARATUS EMPLOYING THE FLUORESCENT INK

(75) Inventors: Shinichi Hakamada, Kanagawa (JP); Shoji Koike, Kanagawa (JP); Akira Nagashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 10/986,006

(22) Filed: Nov. 12, 2004

(65) Prior Publication Data

US 2005/0088502 A1   Apr. 28, 2005

Related U.S. Application Data

(62) Division of application No. 09/923,993, filed on Aug. 8, 2001, now Pat. No. 6,835,239.

(30) Foreign Application Priority Data

| Aug. 8, 2000 | (JP) | ............. 2000-239694 |
| Oct. 20, 2000 | (JP) | ............. 2000-320730 |
| Dec. 21, 2000 | (JP) | ............. 2000-388530 |
| Jul. 19, 2001 | (JP) | ............. 2001-219195 |
| Jul. 31, 2001 | (JP) | ............. 2001-232932 |

(51) Int. Cl.
*C09D 11/02* (2006.01)
*G01D 11/00* (2006.01)

(52) U.S. Cl. ............... 106/31.32; 106/31.5; 106/31.48; 106/31.52; 106/31.59; 347/100

(58) Field of Classification Search ............. 106/31.32, 106/31.5, 31.48, 31.52, 31.59; 347/100
See application file for complete search history.

(56) References Cited

U.S. PATENT DOCUMENTS

| 5,209,998 A | 5/1993 | Kavassalis et al. ...... 430/108.7 |
| 5,580,374 A | 12/1996 | Okumura et al. ............. 524/84 |
| 5,609,673 A | 3/1997 | Takimoto et al. ......... 106/31.48 |
| 5,674,314 A | 10/1997 | Auslander et al. .......... 524/104 |
| 5,681,381 A | 10/1997 | Auslander et al. .......... 523/161 |
| 5,728,201 A | 3/1998 | Saito et al. ............... 106/31.48 |
| 5,865,883 A | 2/1999 | Teraoka et al. .......... 106/31.32 |
| 6,024,785 A | 2/2000 | Morimoto ................. 106/31.57 |
| 6,168,892 B1 | 1/2001 | Ohara et al. ................... 430/45 |
| 6,176,908 B1 | 1/2001 | Bauer et al. ............. 106/31.15 |

(Continued)

FOREIGN PATENT DOCUMENTS

JP   5-293976   11/1993

(Continued)

*Primary Examiner*—J. A. Lorengo
*Assistant Examiner*—Veronica F. Faison
(74) *Attorney, Agent, or Firm*—Fitzpatrick, Cella, Harper & Scinto

(57) ABSTRACT

A novel fluorescent ink is provided which contains at least a coloring material and an aqueous liquid medium for dissolving the coloring material, wherein the coloring material comprises C.I. Acid Red 52 and at least one direct dye, the content of the C.I. Acid Red 52 ranging from 0.1 to 0.4% by weight based on the total amount of the ink, and the content of the direct dye ranging from 0.15 to 0.4% by weight based on the total amount of the ink, and the weight ratio of the direct dye to the C.I. Acid Red 52 is not higher than 1.6. This fluorescent ink is capable of forming prints with fluorescence of high intensity and with high water resistance.

163 Claims, 10 Drawing Sheets

U.S. PATENT DOCUMENTS

| | | | |
|---|---|---|---|
| 6,676,734 B1 | 1/2004 | Nagashima et al. | 347/100 |
| 2002/0047884 A1 | 4/2002 | Nagashima et al. | 347/100 |
| 2002/0145654 A1 | 10/2002 | Nagashima et al. | 347/100 |

FOREIGN PATENT DOCUMENTS

| | | |
|---|---|---|
| JP | 6-191143 | 7/1994 |
| JP | 6-322307 | 11/1994 |
| JP | 7-9755 | 1/1995 |
| JP | 7-305013 | 11/1995 |
| JP | 8-53639 | 2/1996 |
| JP | 8-151545 | 6/1996 |
| JP | 9-1294 | 1/1997 |
| JP | 9-3375 | 1/1997 |
| JP | 9-132729 | 5/1997 |
| JP | 9-137097 | 5/1997 |
| JP | 9-137098 | 5/1997 |
| JP | 9-137099 | 5/1997 |
| JP | 9-165539 | 5/1997 |
| JP | 9-241565 | 9/1997 |
| JP | 9-255904 | 9/1997 |
| JP | 9-286939 | 11/1997 |
| JP | 10-7962 | 1/1998 |
| JP | 10-183043 | 7/1998 |
| JP | 10-193775 | 7/1998 |
| JP | 10-298462 | 11/1998 |
| JP | 10-298467 | 11/1998 |
| JP | 11-80639 | 3/1999 |
| JP | 11-320921 | 11/1999 |
| JP | 2000-38529 | 2/2000 |

EJECTION

FLUORESCENT INK, AND INK CARTRIDGE RECORDING UNIT, INK-JET RECORDING METHOD, AND INK-JET RECORDING APPARATUS EMPLOYING THE FLUORESCENT INK

This application is a division of application Ser. No. 09/923,993 filed Aug. 8, 2001, now U.S. Pat. No. 6,835,239 the contents of which are incorporated herein by reference.

BACKGROUND OF THE INVENTION

1. Field of the Invention

The present invention relates to a fluorescent ink capable of forming a fluorescent image, and a recording unit, an ink cartridge, an ink-jet recording method, and an ink-jet recording apparatus employing the fluorescent ink.

2. Related Background Art

In ink-jet recording, the ink is ejected by utilizing various methods such as attraction by electrostatic force, mechanical vibration or displacement from a piezo element, pressure caused by bubbles formed by heating the ink, and so forth. In recent years, inks are required to be useful for ink-jet recording in various application fields. In such application fields, various techniques are disclosed not only for forming beautiful color images but also for forming fluorescent images for recording information such as characters, numerals, symbols, and bar codes on a recording medium to record non-visible information (e.g., security information). The fluorescent inks are promising in various application fields, so that development of the fluorescent ink which has high stability, high reliability, and high fluorescence developability is awaited. Inks containing a coloring materials having fluorescence developability (hereinafter, fluorescent coloring materials) disclosed in Japanese Patent Application Laid-Open Nos. 8-151545, 9-132729, 10-193775, 10-298462, and 10-298467; and Japanese Patent No. 233038. Various new recording methods and fluorescent coloring materials are disclosed therein.

The use of a fluorescent coloring material is disclosed, for example, in Japanese Patent Application Laid-Open Nos. 5-293976, 6-191143, 6-322307, 7-009755, 7-305013, 8-053639, 9-003375, 9-01294, 9-137097, 9-137098, 9-137099, 9-165539, 9-241565, 9-255904, 9-286939, 10-007962, 10-183043, 11-080639, 11-320921, and 2000-038529; and Japanese Patent No. 2995853.

The water-soluble fluorescent dye useful as a component of the aqueous fluorescent ink includes C.I.(Color Index No.) Basic Red 1, C.I. Basic Red 2, C.I. Basic Red 9, C.I. Basic Red 12, C.I. Basic Red 13, C.I. Basic Red 14, C.I. Basic Red 17, C.I. Acid Red 51, C.I. Acid Red 52, C.I. Acid Red 92, C.I. Acid Red 94, C.I. Basic Violet 1, C.I. Basic Violet 3, C.I. Basic Violet 7, C.I. Basic Violet 10, and C.I. Basic Violet 14.

Of these dyes, C.I. Acid Red 52, which comes to be excited at an excitation wavelength of about 260 nm to fluoresce at wavelength of 580–640 nm, is especially useful as the coloring material of a fluorescent ink for ink-jet recording, since this dye produces intense fluorescence, having high water-solubility, and causing little problem in safety in comparison with other fluorescent basic dyes.

C.I. Acid Red 52, however, is extremely poor in water resistance. Upon contact with water, the prints recorded with a fluorescent ink-jet recording ink containing such a dye, may lose the characteristic fluorescence, or the printed information may be completely vanished.

SUMMARY OF THE INVENTION

The present invention intends to provide a fluorescent ink which is capable of forming a highly fluorescent image with high water resistance of the print, especially a fluorescent ink which is capable of forming a highly fluorescent red image with excellent color tone and high water resistance of the print; and further intends to provide an ink unit, an ink cartridge, an ink-jet recording method, and an ink-jet recording apparatus employing the fluorescent ink. Incidentally, in the present invention, the term "water resistance" signifies not only the capability of retaining the fluorescence of the image but also capability of retaining the visibly recognizable state of the printed information even with loss of the fluorescence.

The above objects can be achieved according to the present invention as below.

According to an aspect of the present invention, an ink-jet recording ink is provided which contains at least a coloring material and an aqueous liquid medium for dissolving the coloring material, wherein the coloring material comprises C.I. Acid Red 52 and at least one direct dye, the content of C.I. Acid Red 52 ranging from 0.1 to 0.4% by weight based on the total amount of the ink, and the content of the direct dye ranging from 0.11 to 0.4% by weight based on the total amount of the ink; and the weight ratio of the direct dye to the C.I. Acid Red 52 being not higher than 1.6.

The preferred embodiments of the present invention include fluorescent inks containing a direct dye having two or more azo groups in the molecule or having a dimer structure; and fluorescent inks containing a direct dye which does not impair the fluorescence of the coexisting C.I. Acid Red 52 and has a color tone, in L*a*b* color space, of a* ranging from −20 to 60, b* ranging from −5 to 60, and $\sqrt{(a^2+b^2)}$ of 30 or more. More specifically, fluorescent inks containing the direct dye in a free acid state represented by the following General Formula(I)

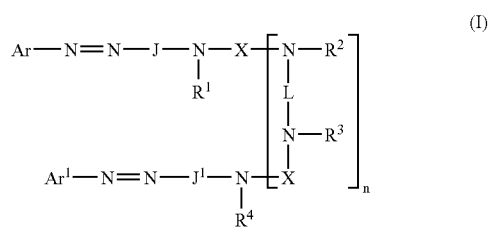

In General Formula (I), Ar and $Ar^1$ are respectively a substituted or unsubstituted aryl group, and at least one of Ar and $Ar^1$ has a substituent selected from COOH and COSH; J and $J^1$ are respectively a group selected from the following General Formulas (1), (2), and (3) below:

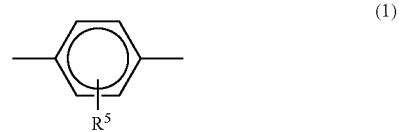

-continued

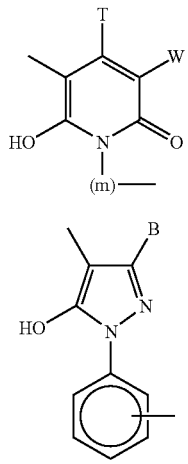

(2)

(3)

(In General Formula (1), $R^5$ is independently selected from H, alkyls, substituted alkyls, alkoxys, halogens, CN, ureido, and $NHCOR^6$; $R^6$ being selected from H, alkyls, substituted alkyls, aryls, substituted aryls, aralkyls, and substituted aralkyls. In General Formula (2), T is an alkyl; W is selected from H, CN, $CONR^{10}R^{11}$, pyridium, and COOH; (m) is an alkylene chain of 2–8 carbon atoms; $R^{10}$ and $R^{11}$ are selected from H, alkyls, and substituted alkyls. In General Formula (3), B is selected from H, and alkyls, and COOH.); and in General Formula (I), $R^1$ $R^2$, $R^3$, and $R^4$ are respectively selected from H, alkyls, and substituted alkyls; L is a divalent organic bonding group; n is an integer of 0 or 1; X is a carbonyl, or one of the following General Formulas (4), (5), and (6) below:

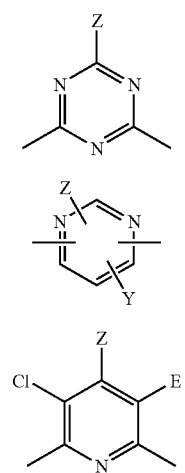

(4)

(5)

(6)

(In General Formulas (4), (5) and (6), Z is selected from $OR^7$, $SR^7$, and $NR^8R^9$; Y is selected from H, Cl, CN, and Z; E is selected from Cl and CN; $R^7$, $R^8$, and $R^9$ are respectively selected from H, alkenyls, substituted alkenyls, alkyls, substituted alkyls, aryls, substituted aryls, aralkyls, and substituted aralkyls; and $R^8$ and $R^9$ may form a five-membered or six-membered ring together with the nitrogen atom bonding therewith.)

When the dye of General Formula (I) does not have an $SO_3H$ group, the dye has at least two groups selected from a COOH group and a COSH group. When the dye of General Formula (I) has one or more $SO_3H$ groups, the dye has groups selected from a COOH group and a COSH group at least in the same number as the number of $SO_3H$.

The aforementioned fluorescent ink is useful in ink-jet recording.

According to another aspect of the present invention, a recording unit is provided which has an ink container containing the aforementioned fluorescent ink for ink-jet recording, and a head for ejecting the ink.

According to still another aspect of the present invention, an ink cartridge is provided which has an ink container containing the aforementioned fluorescent ink.

According to a further aspect of the present invention, an ink-jet recording method is provided which comprises a step of ejecting the aforementioned fluorescent ink for ink-jet recording by application of energy to the ink.

According to a still further aspect of the present invention, an ink-jet recording apparatus is provided which has an ink container containing the aforementioned fluorescent ink for ink-jet recording, and a recording head for ejecting the ink.

DETAILED DESCRIPTION OF THE PREFERRED EMBODIMENTS

Figure 1:
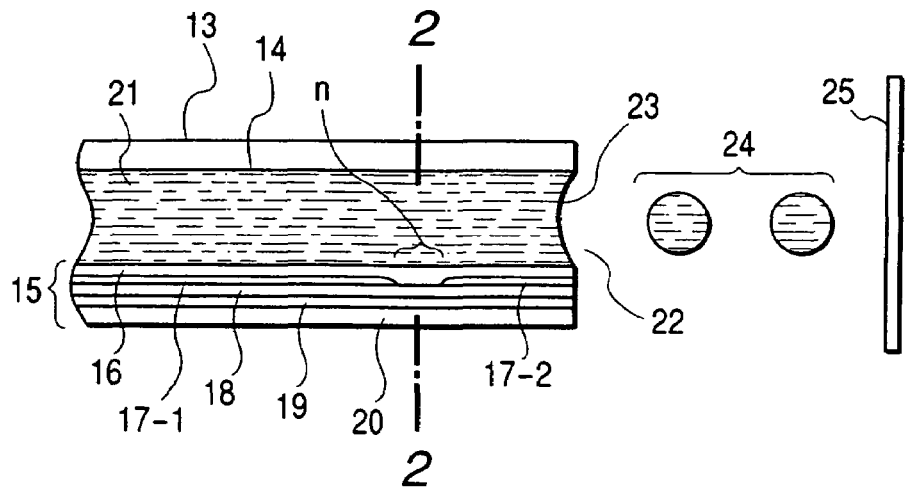
FIG. 1 is a vertical sectional view of a head of an ink-jet recording apparatus.

The present invention is described below in detail by reference to preferred embodiments.

First Embodiment

The fluorescent ink of a first embodiment of the present invention comprises C.I. Acid Red 52 and at least one direct dye as the coloring materials, and an aqueous liquid medium for dissolving the dyes. C.I. Acid Red 52 is selected as mentioned above from numerous fluorescent dyes, being capable of fluorescing at a very high intensity, and being highly soluble in water.

The ink employing this C.I. Acid Red 52 solely as the dye, however, gives poor water resistance of the formed print, as mentioned before. To solve this problem, the inventors of the present invention made studies comprehensively, and found that combined use of at least one direct dye with the above C.I. Acid Red 52 as the coloring material in a specified ratio is effective to form a highly fluorescent image which is not erasable by contact with water. Thus the present invention has been achieved.

Further, the inventors of the present invention made comprehensive study to obtain an ink which gives high water resistance of the print and also forms a red image with high fluorescence intensity. Consequently, it was found that supplementary use of a direct dye is especially effective, the direct dye having a color tone, in L*a*b* color space, of a* ranging from −20 to 60, b* ranging from −5 to 60, and $\sqrt{(a^2+b^2)}$ of 30 or more. The above values of L*a*b* color space were obtained by forming a 100%-solid print on a plain paper sheet (PB paper supplied by Canon Inc.) with an ink composed of diethylene glycol 30 wt %, coloring material 5 wt %, and water 65 wt % by means of an ink-jet recording apparatus BJC-4000 (manufactured by Canon Inc.) having an on-demand type multiple recording head which ejects ink by application of thermal energy in correspondence with recording signals; and measuring the color by means of a spectral color measurement system CMS-500 (manufactured by Murakami Shikisai K.K.) according to JIS Z 8722.

As the results of further study on the direct dyes, the inventors of the present invention found that supplementary use of a direct dye which has two or more azo groups in the molecule or has a dimer structure, specifically the dye represented by the above General Formula (I') gives water-resistant prints without significantly impairing the fluorescence developability of C.I. Acid Red 52 in comparison with combined use of other dyes, and further that the combined use of the direct dye gives excellent color tone as a fluorescent red ink, advantageously.

The fluorescent ink of this embodiment is explained below.

The direct dye is explained below which is useful for combination with C.I. Acid Red 52 in the fluorescent ink of this embodiment. A direct dye is capable of dyeing vegetable fibers (cellulose fiber) such as cotton and rayon directly from an aqueous solution. Most of the direct dyes are of an azo type, generally having a structure of a long molecule having a conjugate system extending in a plane and having at the ends —NH$_2$ or —OH, and having a sulfonic group or a carboxylic group. Specifically the direct dyes include Direct Yellow 12, Direct Yellow 44, Direct Yellow 86, Direct Yellow 132, Direct Yellow 142, Direct Red 4, Direct Red 23, Direct Red 31, Direct Red 79, Direct Red 80, Direct Red 81, Direct Red 89, Direct Red 227, Direct Red 243, Direct Blue 6, Direct Blue 22, Direct Blue 25, Direct Blue 71, Direct Blue 78, Direct Blue 86, Direct Blue 90, Direct Blue 106, Direct Blue 199, Direct Black 51, Direct Black 195; Direct Green 11, 21, 34, 42, and 60; Direct Orange 1, 2, 5, 6, 7, 8, 31, 33, 63, 85, 90, 96, 102, and 104; Direct Brown 2, 58, 59, 60, 73, 112, 167, 168, 179, and 185.

Of the direct dyes, the ones having two azo groups or having a dimer structure have particularly high water resistance, and use of such a dye is advantageous as the results of the investigation made by the inventors of the present invention. Presumably, the molecule of the dye of such a structure is symmetric to easily take a regular steric arrangement to cause strong intermolecular force between the dye molecules, whereby the print recorded with the ink containing such a dye as a coloring material has improved water resistance. For the purpose of the present invention to retain the recorded information printed with the fluorescent ink of the present invention, even on contact with water, any of the aforementioned dyes may be useful without limitation.

In the fluorescent ink of this embodiment, the direct dye to be combined with C.I. Acid Red 52 is preferably at least one selected from those which have a color tone, in L*a*b* color space, of a* ranging from −20 to 60, b* ranging from −5 to 60, and of $\sqrt{(a^2+b^2)}$ of 30 or more.

Specifically, the useful direct dye includes Direct Yellow 12, Direct Yellow 44, Direct Yellow 86, Direct Yellow 132, Direct Yellow 142, Direct Red 4, Direct Red 23, Direct Red 31, Direct Red 62, Direct Red 79, Direct Red 80, Direct Red 81, Direct Red 89, Direct Red 227, Direct Red 243, and Direct Orange 1, 2, 5, 6, 7, 8, 31, 33, 63, 85, 90, 96, 102, and 104.

In preparation of the ink of the present invention by using C.I. Acid Red 52 and at least one direct dye, use of the coloring material having the color tone, in L*a*b* color space, of a*, b*, and $\sqrt{(a^2+b^2)}$ within the aforementioned ranges scarcely impairs the fluorescence of C.I. Acid Red 52, according to the investigation by the inventors of the present invention. On the other hand, the dye having a color tone outside the aforementioned range has its maximum absorption wavelength near the fluorescence spectrum 600 nm of C.I. Acid Red 52, which can offset the fluorescence of C.I. Acid Red 52. The dye having the color tone within the aforementioned range gives red color sensation of the ink, making the ink most suitable as the fluorescent red ink. Therefore, the direct dye having the aforementioned color tone is preferably employed.

The fluorescent ink of this embodiment contains more preferably at least one direct dye represented by General Formula (I) shown below. It was found by the inventors of the present invention that the dye represented by General Formula (I) having plural COOH groups as shown in the formula gives prints of high water resistance in printing especially on an acidic or neutral recording medium like paper, and does not significantly impair the fluorescence of C.I. Acid Red 52 when combinedly used advantageously.

Specifically, C.I. Acid Red 52 has the maximum excitation wavelength at 253 nm, and is excited by absorption of energy at this wavelength to produce intense fluorescence having the maximum fluorescence wavelength of 600 nm. However, some direct dyes to be combinedly used with C.I. Acid Red 52 exhibit slight absorption near the 253 nm. Such a direct dye may decrease the fluorescence intensity of C.I. Acid Red 52. However, the direct dye represented by General Formula (I) below in the present invention scarcely causes such disadvantage.

The dye represented by General Formula (I) is a yellow dye. Therefore, use of this dye as the only one direct dye in the dye combination may make the printed information indecipherable after contact of the print with water. To keep the information decipherable even in contact with water, another direct dye selected from the ones mentioned above is preferably employed additionally.

The dye represented by General Formula (I) is explained in detail.

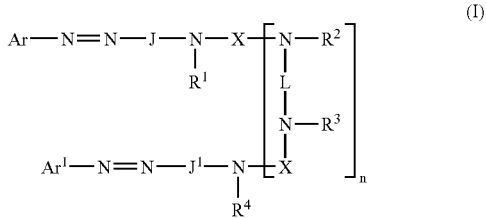

(I)

In General Formula (I), Ar and $Ar^1$ are respectively a substituted aryl or an unsubstituted aryl, and at least one of Ar and $Ar^1$ has a substituent selected from COOH and COSH; J and $J^1$ are respectively a group selected from General Formulas (1), (2), and (3) below:

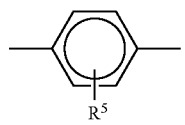

(1)

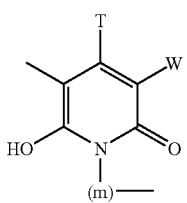

(2)

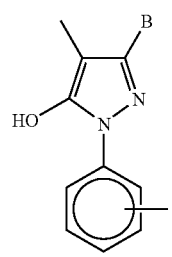

(3)

In General Formula (1), $R^5$ is a group selected from H, alkyls (e.g., a linear or branched alkyl of 1–20 carbon atoms), substituted alkyls (e.g. an alkyl in which at least one hydrogen atom is substituted by a halogen atom (fluorine atom, chlorine atom, bromine atom, etc.) or an alkoxy of 1–3 carbon atoms, etc.), alkoxys (e.g., methoxy, ethoxy, and propoxy), halogen atoms (fluorine atom, chlorine atom, bromine atom, etc.), CN, ureido, and $NHCOR^6$. $R^6$ is selected from H, alkyls (e.g., a linear or branched alkyl of 1–20 carbon atoms), substituted alkyls (e.g. an alkyl in which at least one hydrogen atom is substituted by a halogen atom (fluorine atom, chlorine atom, a bromine atom, etc.) or an alkoxy of 1–3 carbon atoms, etc.), aryls (e.g., a phenyl), substituted aryls (e.g., a phenyl substituted with at least one group selected from halogen atoms (e.g., fluorine atom, chlorine atom, and bromine atom), alkoxys of 1–3 carbon atoms, and linear or branched alkyls of 1–3 carbon atoms), aralkyls (e.g., phenylmethyl, and phenylethyl), and substituted aralkyls (e.g., aralkyls in which the aryl group constituting the aralkyl is substituted with at least one group selected from halogen atoms (fluorine atom, chlorine atom, bromine atom, etc), linear or branched alkyls of 1–3 carbon atoms, and alkoxys of 1–3 carbon atoms).

In General Formula (2), T is an alkyl (e.g., a linear or branched alkyl of 1–20 carbon atoms) or a substituted alkyl (e.g. an alkyl in which at least one hydrogen atom is substituted by a halogen atom (fluorine atom, chlorine atom, bromine atom, etc.) or an alkoxy of 1–3 carbon atoms, etc.); W is selected from H, CN, $CONR^{10}R^{11}$, pyridium, and COOH; (m) is an alkylene chain of 2–8 carbon atoms; $R^{10}$ and $R^{11}$ are respectively selected from H, alkyls (e.g., a linear or branched alkyl of 1–20 carbon atoms), and substituted alkyls (e.g. an alkyl in which at least one hydrogen atom is substituted by a halogen atom (fluorine atom, chlorine atom, bromine atom, etc.), and an alkoxy of 1–3 carbon atoms, etc.).

In General Formula (3), B is selected from H, alkyls (e.g., a linear or branched alkyl of 1–20 carbon atoms), substituted alkyls (e.g. an alkyl in which at least one hydrogen atom is substituted by a halogen atom (fluorine atom, chlorine atom, bromine atom, etc.) or an alkoxy of 1–3 carbon atoms, etc.), and COOH.

In General Formula (I), $R^1$ $R^2$, $R^3$, and $R^4$ are respectively selected from H, alkyls (e.g., a linear or branched alkyl of 1–20 carbon atoms), substituted alkyls (e.g. an alkyl in which at least one hydrogen atom is substituted by a halogen atom (fluorine atom, chlorine atom, bromine atom, etc.) or an alkoxy of 1–3 carbon atoms, etc.); L is a divalent organic bonding group (e.g., —NH-φ-NH; φ being a phenylene, or the like); n is an integer of 0 or 1; and X is a carbonyl or one of General Formulas (4), (5), and (6) below:

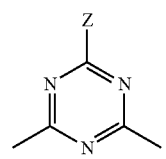

(4)

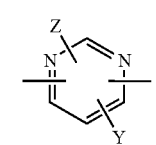

(5)

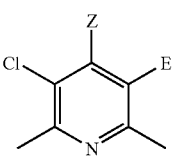

(6)

In General Formulas (4)–(6), Z is selected from $OR^7$, $SR^7$, and $NR^8R^9$; Y is selected from H, Cl, CN, and Z; E is selected from Cl and CN; $R^7$, $R^8$, and $R^9$ are respectively selected from H, alkenyls (e.g., an alkenyl of 1–20 carbon atoms), substituted alkenyls (e.g. an alkenyl in which at least one hydrogen atom is substituted by a halogen atom (fluorine atom, chlorine atom, bromine atom, etc.) or an alkoxy of 1–3 carbon atoms, etc.), alkyls (e.g., a linear or branched alkyl of 1–20 carbon atoms), substituted alkyls (e.g. an alkyl in which at least one hydrogen atom is substituted by a halogen atom (fluorine atom, chlorine atom, bromine atom, etc.) or an alkoxy of 1–3 carbon atoms, etc.), aryls (e.g., phenyl), substituted aryls (e.g., a phenyl substituted with at least one group selected from halogen atoms (e.g., fluorine atom, chlorine atom, and bromine atom), alkoxys of 1–3 carbon atoms, linear or branched alkyls of 1–3 carbon atoms), aralkyls (e.g., phenylmethyl, and phenylethyl), and substituted aralkyls (e.g., aralkyls in which the aryl group constituting the aralkyl is substituted with at least one group selected from halogen atoms (fluorine atom, chlorine atom, bromine atom, etc.), linear or branched alkyls of 1–3 carbon atoms, and alkoxys of 1–3 carbon atoms). $R^8$ and $R^9$ may form a five-membered or six-membered ring together with the nitrogen atom bonding therewith.

The dyes of General Formula (I) which does not have an $SO_3H$ group has at least two groups selected from a COOH group and a COSH group. The dye of General Formula (I) which has one or more $SO_3H$ groups has groups selected from a COOH group and a COSH group at least in the same number as the number of $SO_3H$.

Examples of the dye represented by General Formula (I) include C.I. Direct Yellow 173 and compounds exemplified below:

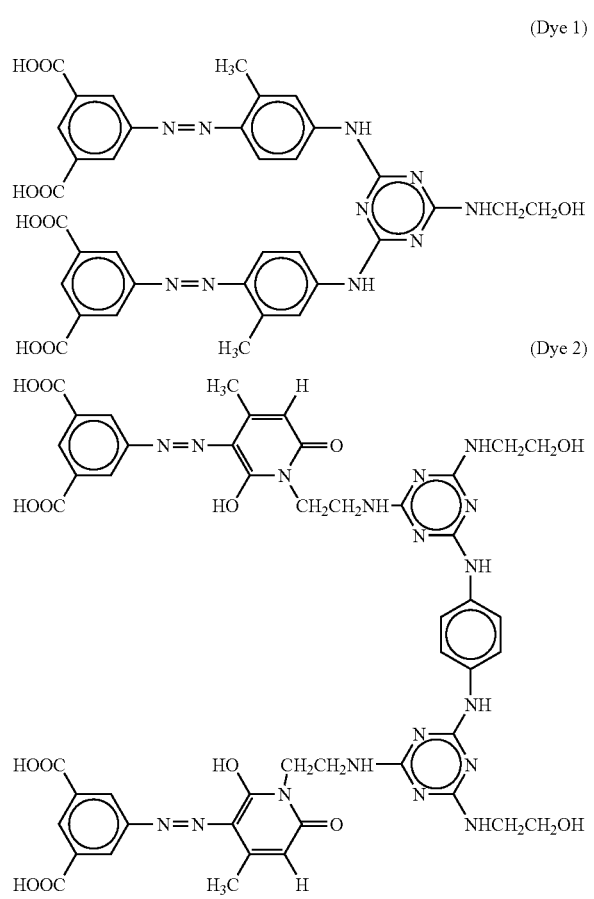

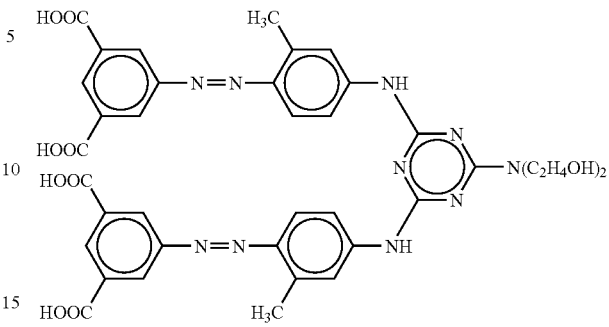

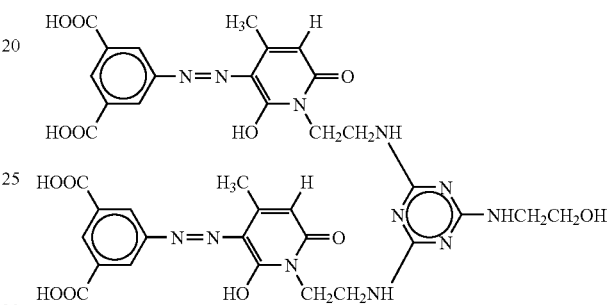

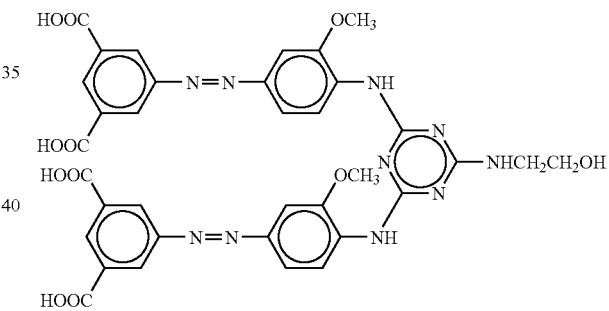

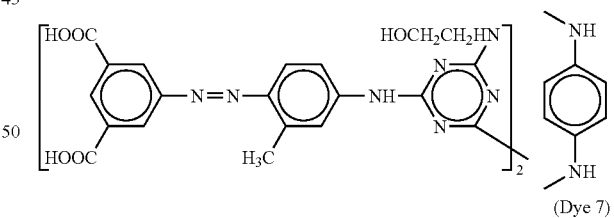

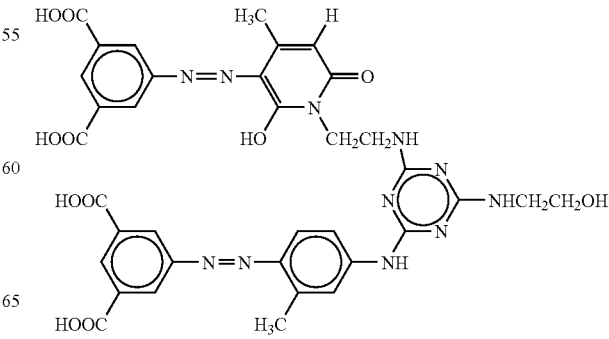

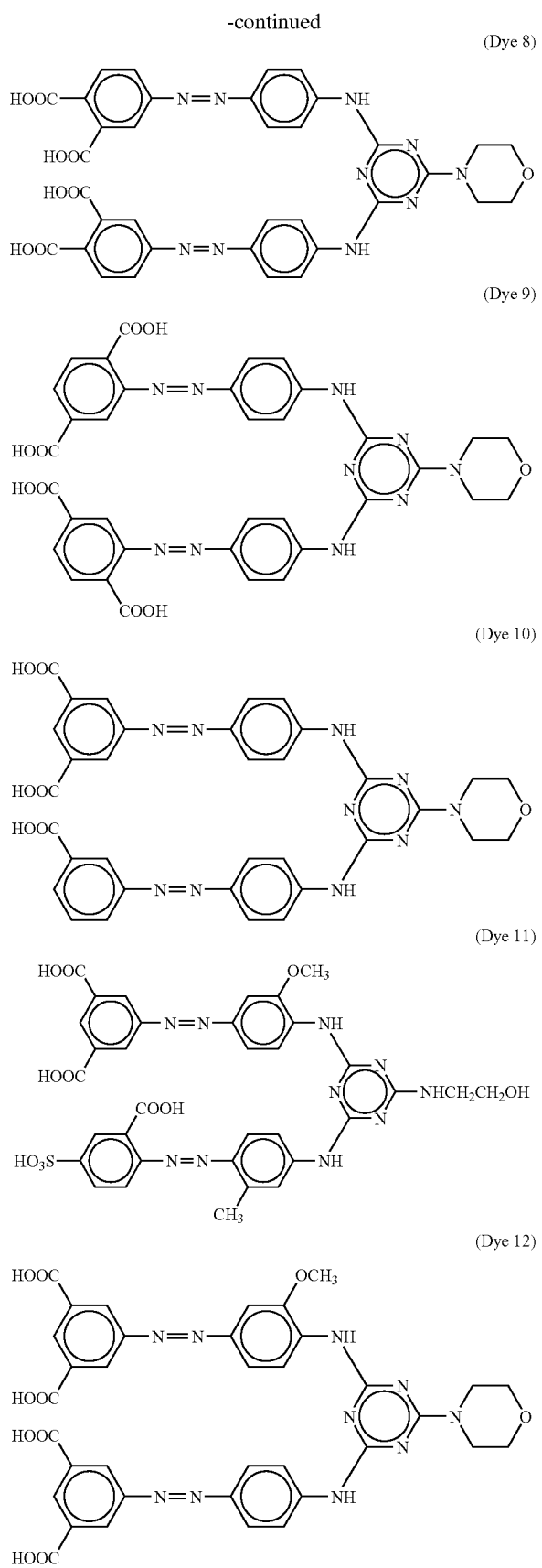

Figure 8:
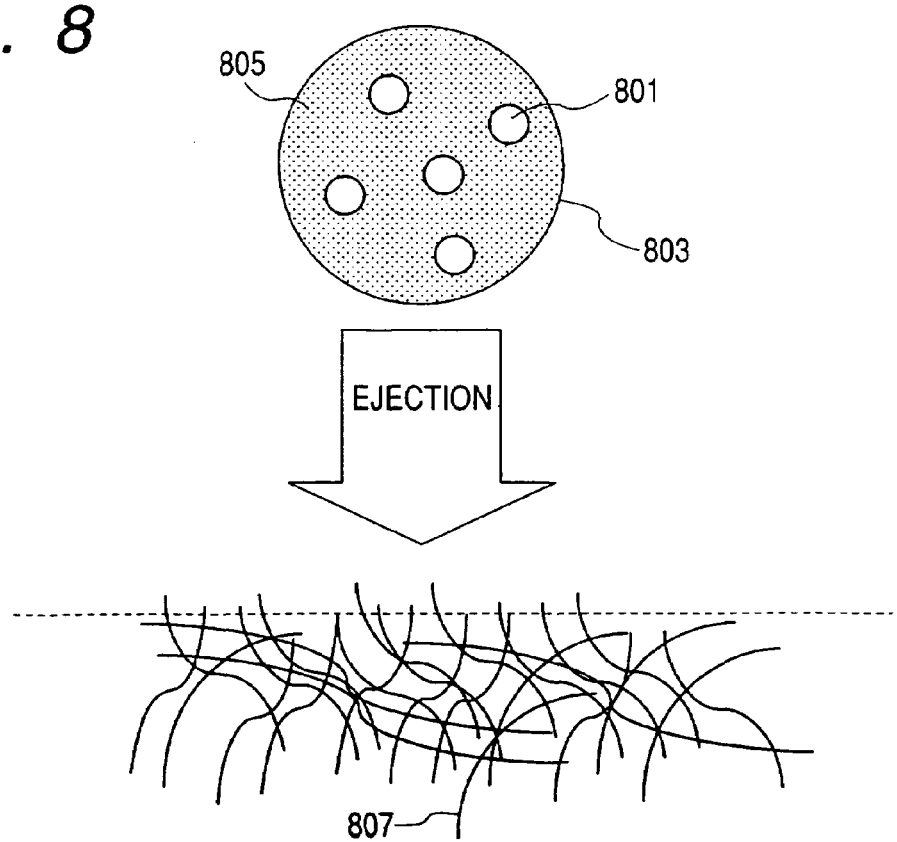
FIG. 8 is a drawing for explaining a relation of the coloring material concentration with the fluorescence intensity.
Figure 9:
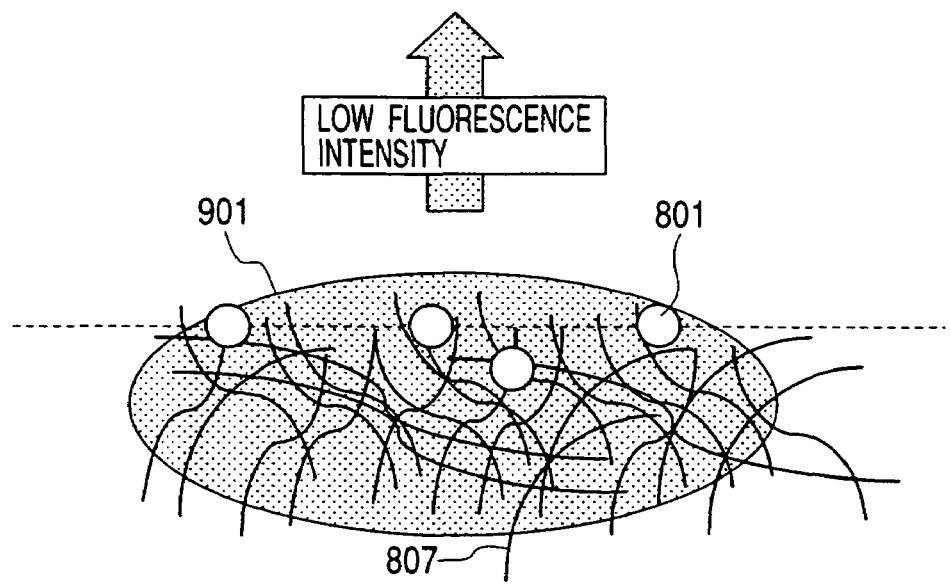
FIG. 9 is a drawing for explaining a relation of the coloring material concentration with the fluorescence intensity.
Figure 10:
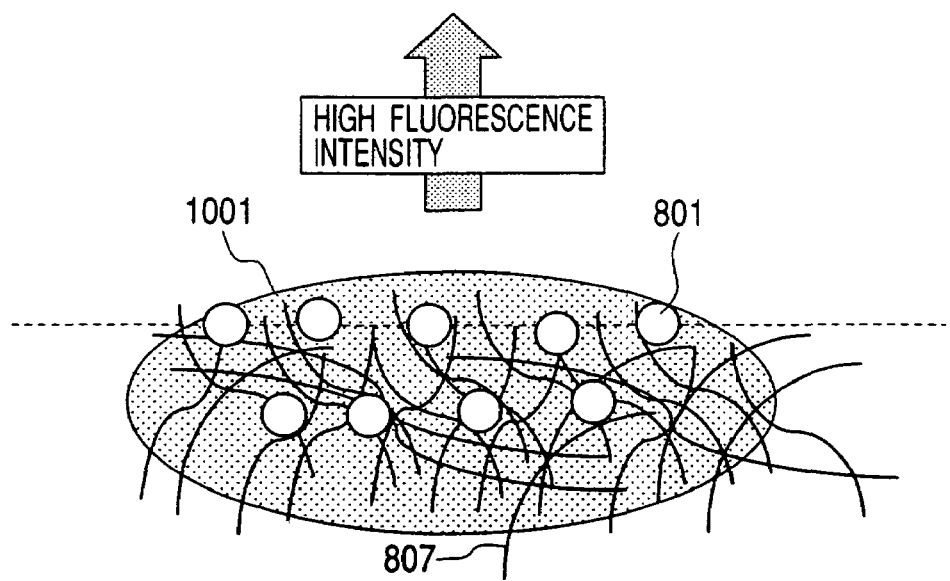
FIG. 10 is a drawing for explaining a relation of the coloring material concentration with the fluorescence intensity.
Figure 11:
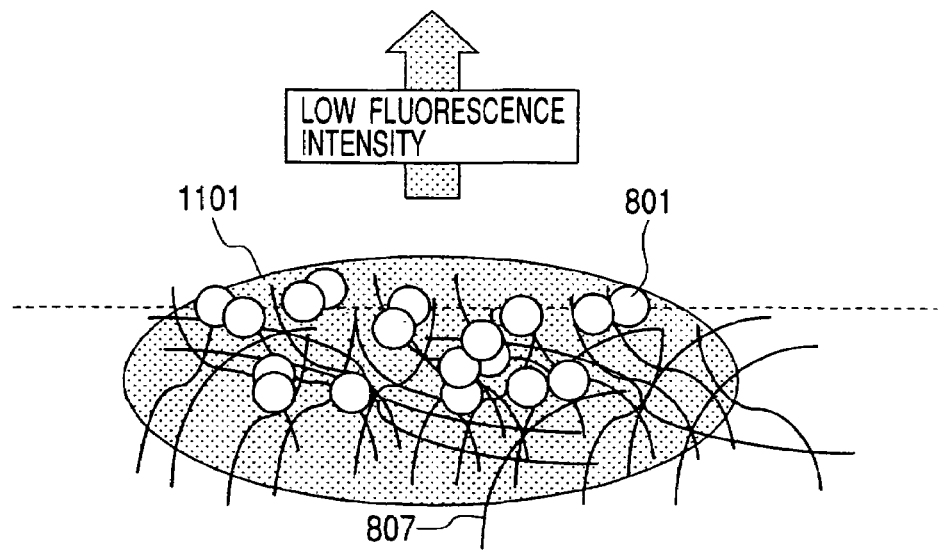
FIG. 11 is a drawing for explaining the fluorescence intensity when another coloring material is used supplementally in combination.

The fluorescent ink of this embodiment contains C.I. Acid Red 52 at a content ranging preferably from 0.1 to 0.4 wt %, more preferably from 0.2 to 0.3 wt % based on the total amount of the ink. Generally, the fluorescent dye is known to produce weak fluorescence at a concentration higher than a certain limit as well as at a low concentration: intense fluorescence is produced in a certain concentration range. This phenomenon is explained by reference to FIGS. 8 to 12 for printing on a paper sheet as the recording medium. FIG. 8 shows schematically a state of an ink drop 803 containing a fluorescent coloring material 801 and a solvent 805 immediately before ink drop deposition onto a recording medium containing cellulose fiber 807. FIG. 9 shows schematically a state of the ink drop 901 deposited and the coloring material fixed onto the paper sheet when the amount of the fluorescent coloring material 801 fixed on the recording medium is small. In this state, fluorescence intensity is not sufficiently high. On the other hand, as shown in FIG. 10, intense fluorescence can be obtained when the ink droplet 1001 is fixed to the recording medium and a suitable amount of the fluorescent coloring material is present on the surface of the recording medium. In this state, the intense fluorescence is obtained presumably owing to absence of interaction (aggregation, association, or the like) between the fluorescent coloring material molecules at such a concentration. When the ink droplet 1101 is fixed to the recording medium and a larger amount of the fluorescent coloring material is present onto the recording medium as shown in FIG. 11, presumably the probability of the occurrence of interaction (aggregation, association, etc.) between the fluorescent coloring material molecules increases to render the fluorescence development insufficient and to lower the fluorescence intensity. The same phenomenon occurs with C.I. Acid Red 52 employed in the present invention, and the sufficient fluorescence intensity can be obtained in the aforementioned content range based on the total amount of the ink.

In the case where C.I. Acid Red 52 and the aforementioned selected direct dye are combinedly used in the ink of the present invention, the direct dye is contained at a content ranging preferably from 0.11 to 0.4 wt % based on the total amount of the ink and at a ratio thereof to C.I. Acid Red 52 preferably not higher than 1.6 by weight, more preferably not higher than 1.4 by weight in order to obtain sufficient fluorescence of the ink. Within the aforementioned range of the amount the direct dye, the print is capable of producing the fluorescence at a sufficient intensity and keeping visible decipherability even after contact with water.

Figure 12:
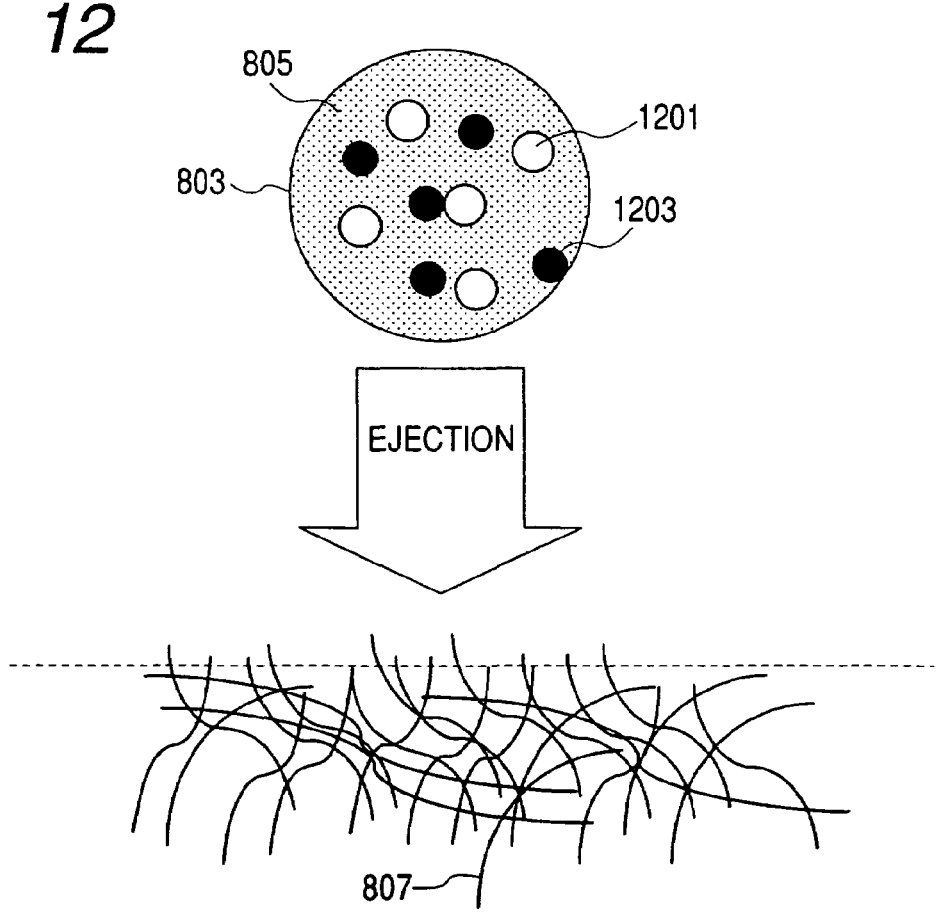
FIG. 12 is a drawing for explaining the fluorescence intensity when another coloring material is used supplementally in combination.
Figure 13:
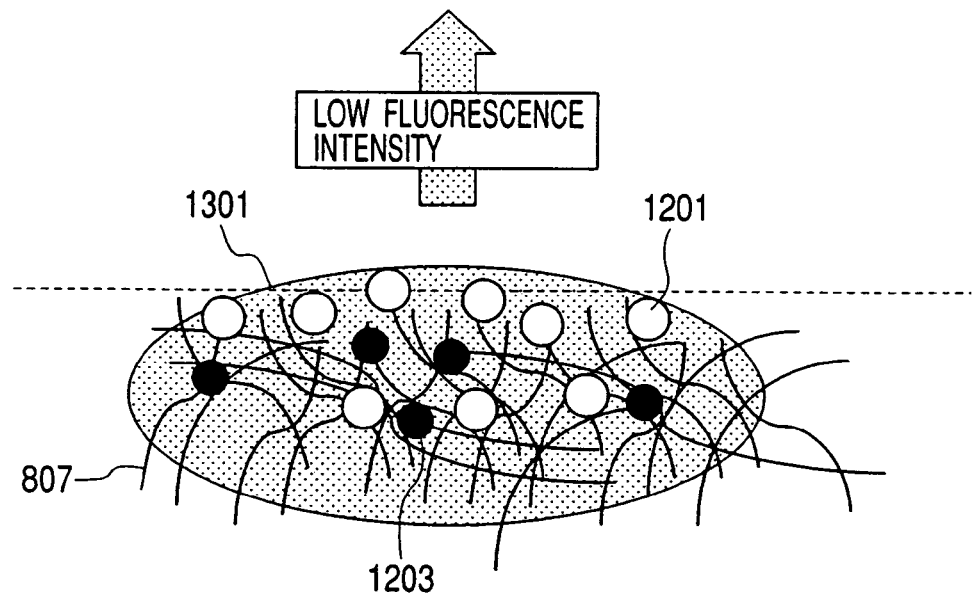
FIG. 13 is a drawing for explaining the fluorescence intensity when another coloring material is used supplementally in combination.
Figure 14:
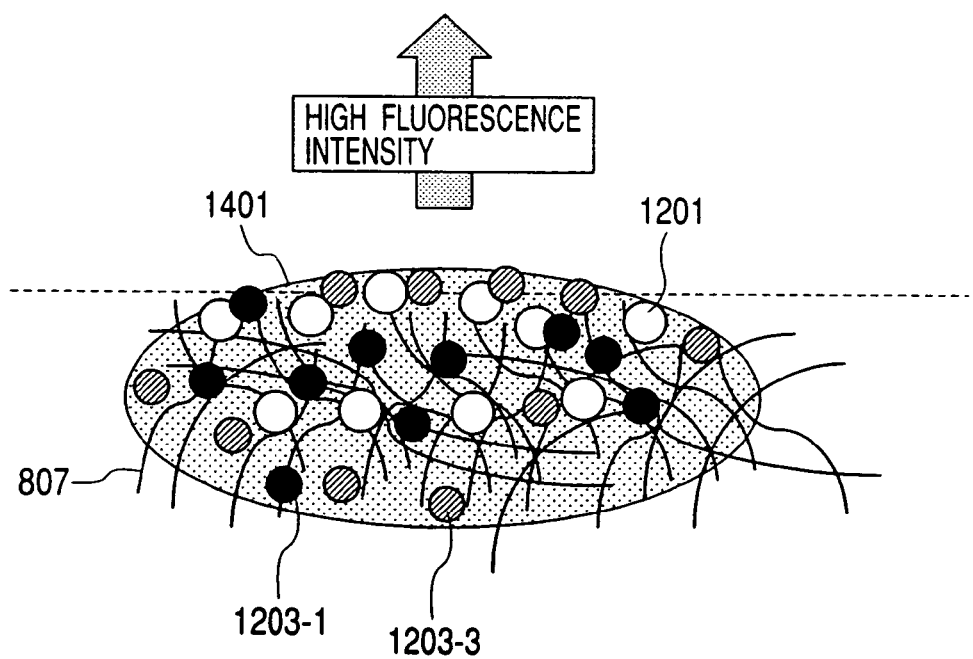
FIG. 14 is a drawing for explaining the fluorescence intensity when another coloring material is used supplementally in combination.

As shown in FIGS. 12 and 13, when C.I. Acid Red 52, indicated by numeral 1201, and the supplementary coloring material 1203 are used in combination in suitable amounts, specifically when the amount of the fluorescent coloring material is enough to cause fluorescence and the amount of the supplementary coloring material is in such a range as to cause chemical or physical bonding with the cellulose fiber 807, sufficient intensity of fluorescence is produced. In this state, in the ink drop fixed region 1301, a larger portion of the supplementary coloring material 1203 is adsorbed by paper cellulose fiber 807 with little portion thereof being free, whereby the fluorescence of C.I. Acid Red 52 is scarcely hindered. On the other hand, as shown in FIG. 14, when the supplementary coloring material is used in an excessive amount, a portion 1203-1 chemically or physically bonding to the cellulose fiber 807, and a larger portion 1203-3 of the free supplementary coloring material which cannot be adsorbed by the cellulose fiber are present in the region of the ink fixation. This free supplementary coloring material can hinder significantly the fluorescence of C.I. Acid Red 52. From the above reasons, the higher water resistance of the print, which is an object of the present invention, can be achieved and a color print can be formed with intense fluorescence by limiting the mixing ratio of the direct dye to C.I. Acid Red 52 to be not higher than 1.6 by weight.

Next, the aqueous liquid medium for constituting the ink of the present invention together with the above-described dyes is explained below. The aqueous liquid medium used in the present invention is preferably constituted mainly of water. The content of water in the ink ranges from 10 to 95 wt %, preferably from 25 to 93 wt %, more preferably from 40 to 90 wt %. The water used in the present invention is preferably deionized water.

In this embodiment, water may be used solely as the aqueous liquid medium of the ink. However, use of an aqueous organic solvent jointly with water will make the effects of the ink more remarkable.

The aqueous organic solvent applicable to the ink of this embodiment includes specifically alkyl alcohols of 1–5 carbon atoms such as methyl alcohol, ethyl alcohol, n-propyl alcohol, isopropyl alcohol, n-butyl alcohol, sec-butyl alcohol, tert-butyl alcohol, isobutyl alcohol, and n-pentanol; amides such as diemthylformamide, and dimethylacetamide; ketones and ketoalcohols such as acetone, and diacetone alcohol; ethers such as tetrahydrofuran, and dioxane; oxyethylene or oxypropylene addition polymers such as diethylene glycol, triethylene glycol, tetraethylene glycol, dipropylene glycol, tripropylene glycol, polyethylene glycol, and polypropylene glycol; alkylene glycols having an alkylene of 2–6 carbon atoms such as ethylene glycol, propylene glycol, trimethylene glycol, butylene glycol, pentanediol, and hexylene glycol; triols such as glycerin, trimethylolethane, trimethylolpropane, and 1,2,6-hexanetriol; thiodiglycol; bishydroxyethyl sulfone; lower alkyl glycol ethers such as ethylene glycol monomethyl (or monoethyl, or monobutyl) ether, diethylene glycol monomethyl (or monoethyl, or monobutyl) ether, and triethylene glycol monomethyl (or monoethyl, or monobutyl) ether; lower dialkyl glycol ethers such as triethylene glycol dimethyl (or diethyl) ether, and tetraethylene glycol dimethyl (or diethyl) ether; alkanolamines such as monoethanolamine, diethanolamine, and triethanolamine; sulfolane; N-methyl-2-pyrrolidone; 2-pyrrolidone; and 1,3-dimethyl-2-imidazolidinone. The above aqueous solvents may be used singly or a mixture thereof.

The aqueous organic solvent is contained in the ink at a content generally not higher than 50 wt %, preferably ranging from 5 to 40 wt %, more preferably from 10 to 30 wt %.

Of the aforementioned aqueous organic solvents, particularly preferred are ethylene glycol, diethylene glycol, triethylene glycol, thiodiglycol, glycerin, trimethylolpropane, 1,2,6-hexanetriol, ethyl alcohol, isopropyl alcohol, bishydroxyethyl sulfone, and so forth.

The ink in the present invention may contain, in addition to the above components, urea, thiourea, or a urea derivative, or an additive for imparting the desired properties to the ink such as a pH adjuster, a viscosity adjuster, an antiseptic agent, an antioxidant, an evaporation promotor, a rust preventive, a fungicide, and a chelating agent.

Second Embodiment

A second embodiment of the fluorescent ink of the present invention is described below.

The fluorescent ink of this embodiment contains:
(i) a first organic compound and a second organic compound which are incompatible with each other,
(ii) a direct dye, and C.I. Acid Red 52 which is the fluorescent coloring material, and
(iii) a liquid medium for dissolving or dispersing the above components (i) and (ii), the C.I. Acid Red 52 being contained at a content ranging from 0.1 to 0.4 wt % based on the total amount of the ink, and the direct dye being contained at a ratio to the C.I. Acid Red 52 of not higher than 1.6 by weight.

The fluorescent ink of this embodiment achieves the effects of forming a fluorescent colored print with further improved fluorescence intensity in addition to the effects of the first embodiment.

The inventors of the present invention found that the stability and reliability of the print can be improved further with high fluorescent developability and fluorescence characteristics by incorporating into the fluorescent ink of the above first embodiment a first organic compound and a second organic compound which are incompatible with each other and are soluble or dispersible in the liquid medium. The mechanism thereof is explained below.

The inventors of the present invention considered various mechanisms of fluorescence development of the fluorescent ink for achieving higher stability and higher reliability of the prints, and investigated coloring materials and ink compositions therefor. Unexpectedly, the inventors of the present invention found that the use of two kinds of compounds incompatible with each other as the ink constituents improves the fluorescence development of the print. Thus the ink of the present invention has been completed.

According to the above findings, the ink which comprises two kinds of organic compounds incompatible with each other, a coloring material combination of C.I. Acid Red 52 with a direct dye, and a liquid medium for dissolving or dispersing the mentioned components will give printings on a recording medium with improvement of fluorescence intensity and color developability, and other printing qualities with stability and reliability of the prints, especially in ink-jet recording. In particular, the fluorescent ink for ink-jet recording of this embodiment of the present invention gives prints with remarkably high fluorescence intensity in comparison with conventional fluorescent ink.

Generally in consideration of the mechanism of the stability and reliability of the printings and fluorescence intensity and the color development of the ink, attention is concentrated to uniformity of dissolution or dispersion of the coloring material in the ink for improving the fluorescence and color development. In other words, in designing of the ink, the investigation is made on the prevention of association of the coloring material molecules or aggregation of dispersed coloring material particles for their smaller size, increase of the optical absorbance of the ink, and retention of the increased absorbance. Efforts are made with such a design to prevent association or aggregation of the coloring material molecules or dispersed particles to improve the color developability and fluorescence of the coloring material.

The inventors of the present invention re-investigated conventional recorded matters (printings) formed by application of an ink onto a recording medium regarding the state of ink on various recording medium. Consequently, the inventors noticed that an interface exists between the recording medium and the ink unexceptionably even if the interface may not be sharp, and that the ink on the recording medium has also a surface facing the atmosphere. Further, it was also noticed that in printing on a wood-free paper sheet, for example, increase of penetration of the ink tends to visibly lower the color developability of the coloring material, and that recording on a back-coated film, or lamination of a print improves the color developability visibly. Therefore, the inventors of the present invention made studies on the formation of such an interface condition of the ink to the atmosphere as to improve the color developability of the print on a recording medium after recording, and retention of such a condition. Consequently this embodiment of the present invention has been achieved.

The inventors of the present invention assume as below the mechanism of remarkable improvement of the fluorescence developability and the color developability of the fluorescent ink of this embodiment of the present invention.

Figure 15:
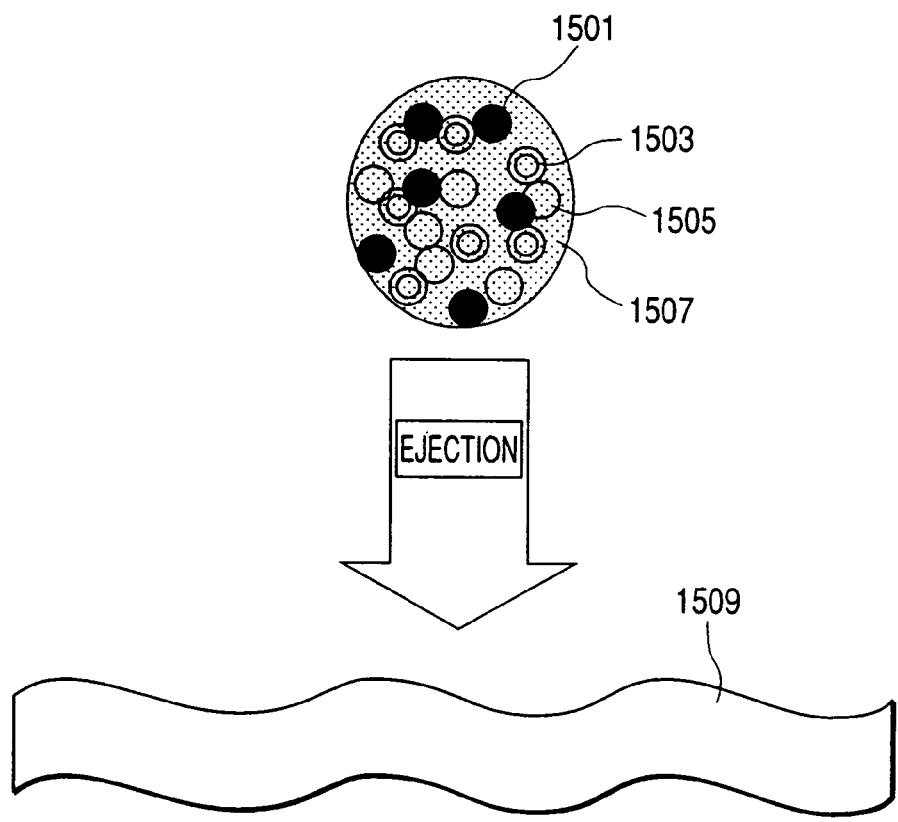
FIG. 15 is a drawing for explaining the mechanism of color development having the fluorescent intensity of the present invention.
Figure 16:
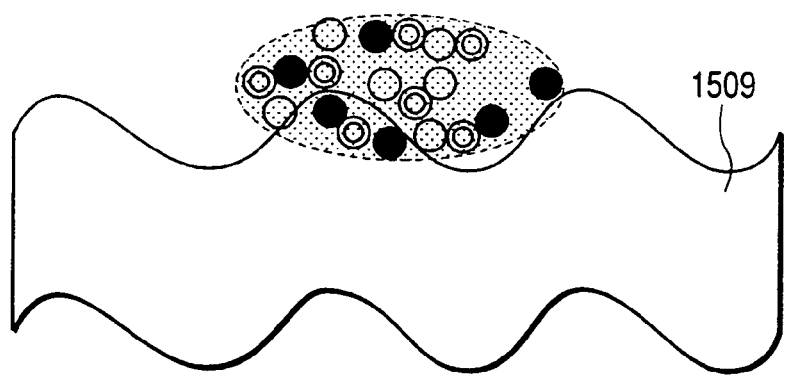
FIG. 16 is a drawing for explaining the mechanism of color development having the fluorescent intensity of the present invention.
Figure 17:
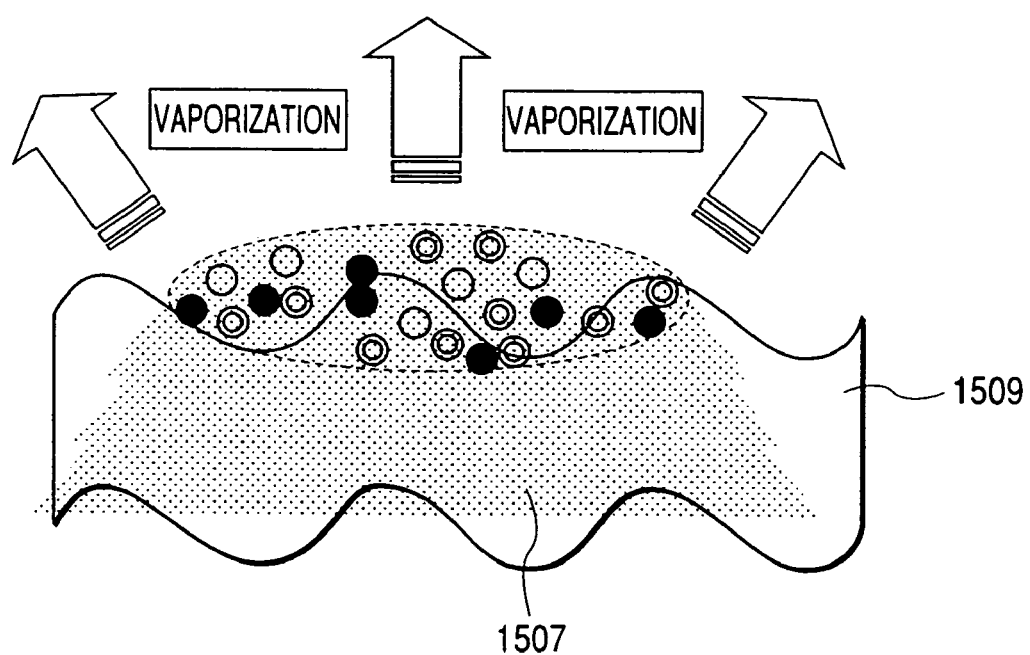
FIG. 17 is a drawing for explaining the mechanism of color development having the fluorescent intensity of the present invention.
Figure 18:
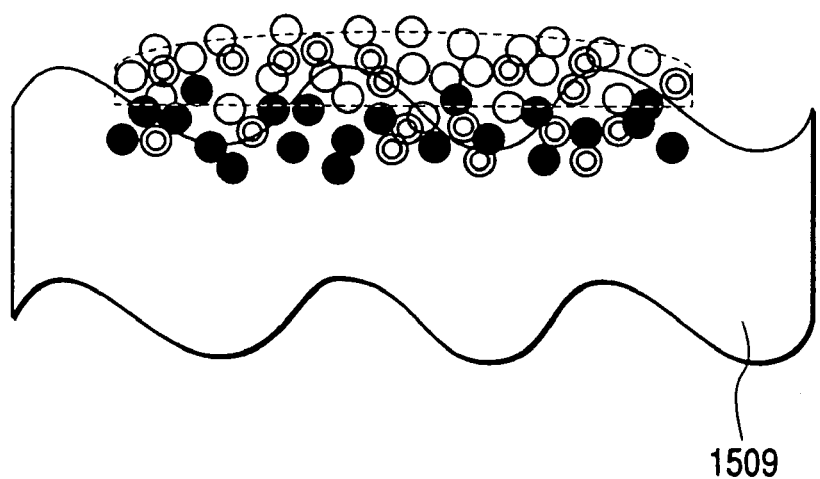
FIG. 18 is a drawing for explaining the mechanism of color development having the fluorescent intensity of the present invention.
Figure 19:
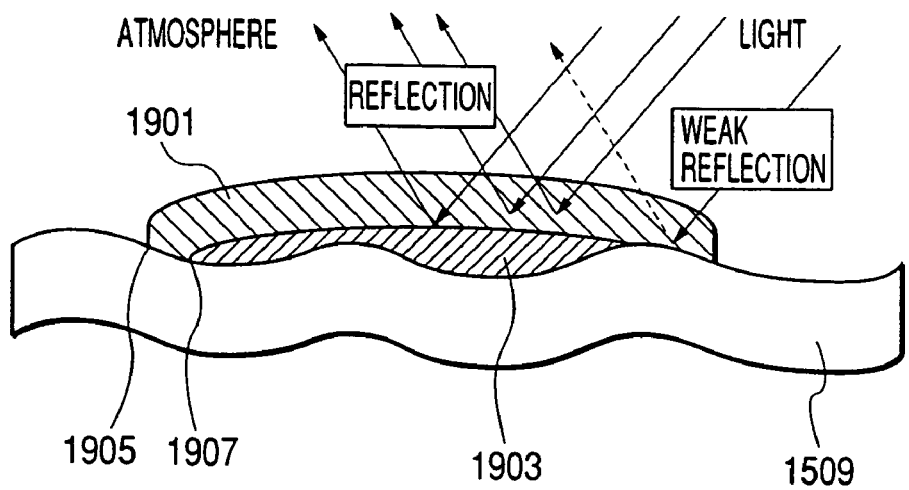
FIG. 19 is a drawing for explaining the mechanism of color development having the fluorescent intensity of the present invention.

As shown in FIG. 15, the ink of this embodiment contains the respective components dissolved or dispersed uniformly and stably in the liquid medium before printing. In FIG. 15, a first organic compound 1501 and a second organic compound 1503 are incompatible with each other. FIG. 16 shows a state of the ink having been deposited on a recording medium 1509 for printing. After the deposition, a part of the ink component (especially the liquid medium 1507) evaporates into the air and another part of the ink components penetrates or diffuses into the recording medium 1509 as shown in FIG. 17 to change the constitution and component ratios of the ink on the recording medium 1509. Thereby the two incompatible organic compounds 1501, 1503 present stably in the ink before printing cause laminar phase separation on the recording medium 1509. Consequently, as shown in FIG. 18, an interface is formed between the ink and the atmosphere by the ink components to bring a lamination-like state. FIG. 19 is a schematic illustration of the state of FIG. 18 for ready understanding. In FIG. 19, the layer 1901 contains the organic compound 1503 and the coloring material 1505, whereas the layer 1903 contains the organic compound 1501 and the coloring material 1505. The surface of the layer 1901 forms a gas-liquid interface 1905, and the layer 1901 and 1903 form a liquid-liquid interface 1907. As the results, the recorded matter printed with the ink of this embodiment reflects light effectively at the liquid-liquid interface 1907 owing to the formation of the layer 1901 having a stable thickness formed by formation of the interface. This improves the color developability including fluorescence intensity, and provides a method for improving remarkably the fluorescence and color developability of the prints.

The inventors of the present invention found that use of a surfactant as one of the two incompatible organic compounds gives image with especially excellent color developability including fluorescence intensity. Presumably, the used surfactant forms a surfactant micelle layer 2001 (layer A) as the surface layer and this layer A effectively reflects the light to improve the color developability including fluorescence intensity.

According to the investigation made by the inventors of the present invention, water is preferred as the liquid medium for keeping the two incompatible organic compounds constituting the fluorescent ink of the present invention in a uniform state in the ink. The use of water as the liquid medium enables use of a diversity of compounds as the ink components in comparison with liquid mediums other than water to enlarge the scope of selection of the ink constituents. Further, the water keeps the quality of the print recorded on wood-free paper; the liquid medium can be removed by penetration into the wood-free paper, and the image can be stable in evaporation of the liquid medium, advantageously.

The fluorescent ink of this embodiment is preferably applied through a clearance onto a recording medium for recording. The recording with direct pressure contact with the recording medium like recording with a ball-point pen presses the ink into the recording medium, not achieving the effect of the mechanism of this embodiment.

The constituents other than the above described coloring materials of the fluorescent ink of this embodiment for achieving the effects of the above mechanism are explained below.

The combination of the two organic compounds incompatible with each other constituting the fluorescent ink of this embodiment signifies combination of two organic compounds which will separate into layers on simple mixing of only the two organic compounds, like water and oil.

Specifically, in a ternary component system consisting of two organic compounds incompatible with each other and water as the solvent, the two incompatible organic compounds are dissolved in water as the solvent in the initial state. With evaporation of the water as the solvent, for example in the environment of 50° C., the incompatible organic compounds come to cause liquid-liquid separation during the evaporation of water to achieve the effects of the mechanism of this embodiment. The liquid medium for the organic compounds is selected from a diversity of liquids in consideration of compatibility with the two incompatible organic compounds. Particularly preferred liquid medium is water. This is because of the stability of the ink, the quality of the image formed with a nonaqueous liquid medium mentioned in the explanation of the mechanism, and the freedom in selection of the two organic compounds incompatible with each other.

The two organic compounds incompatible with each other may be combination of any compounds which cause phase separation into layers like water and oil on simple mixing of only the two compounds. A combination is preferred in which one organic compound has a solubility parameter of 15 or more and the other organic compound has a solubility parameter of 13 or less. The two compounds having closer solubility parameters tends to become compatible, which prevents the effects of the present invention. Incidentally, the solubility parameter herein is a value obtained by a method of Fedors.

One of the two organic compounds incompatible with each other has preferably a glycerin group in the molecule. The glycerin group has a high hydrating ability, serving as the aqueous compound in the combination shown specifically as water-and-oil. Of these, preferred are sugar alcohol monomers such as glycerin, xylitol, and erythritol; and sugar alcohol dimers and trimers such as diglycerin and triglycerin.

The above compound may have a substituent derived from ethylene oxide, propylene oxide, and combination thereof. Of these, particularly preferred are those having three or more hydroxyl groups, and being liquid at room temperature. Such a compound is contained at a content preferably from 1.0 to 30 wt %, more preferably from 5.0 to 20 wt % based on the total weight of the ink. The content is not limited to the above, depending on the kind of the recording medium.

The other of the two organic compounds incompatible with each other of the ink constituents is explained below. An example of the compound corresponding to oil which separates in a layer from the above-explained first organic compound to achieve the effect of the aforementioned mechanism is a nonionic surfactant.

The nonionic surfactant employed as a constituent of the fluorescent ink of this embodiment is preferably water-soluble and does not separate out from the water solution for the stability of the ink. That is, the surfactant in the water is preferably dissolved or uniformly dispersed in appearance. In particular, nonionic surfactants are preferred which are emulsifiable in an aqueous solution. The content of the nonionic surfactant is preferably not higher than the maximum content at which the surfactant can take an emulsion state to ensure the stability of the ink.

The nonionic surfactant useful in this embodiment are those having an HLB value of not more than 13. The nonionic surfactant having the HLB of 13 or less does not have excessive hydrophilicity of the surfactant, being capable of forming an interface of ink components between the ink and the atmospheric air to achieve the effects of the aforementioned mechanism to improve the color developability including the fluorescence intensity.

The surfactant which has the property intermediate between water and oil to show a cloud point improves the color developability including fluorescence intensity in the surfactant phase. Presumably, the compound material giving fluorescence and/or the fluorescent coloring material is dissolved and/or dispersed in nearly a monomolecular state which is the most suitable state for color development including fluorescence, and a supersaturated component is dissolved and/or dispersed in the phase not compatible with the surfactant, thereby the color developability including fluorescence being improved.

The nonionic surfactant for the fluorescent ink of this embodiment is contained in the ink at a content preferably not less than 1 wt %, more preferably ranging from 1 to 20 wt %. At the content lower than 1 wt %, the effect of the aforementioned mechanism is not sufficiently achievable, whereas at the content higher than 20 wt %, the balance of the print quality, such as balance between concentration and fixability, and balance between feathering and fixability tends to be impaired.

Of the nonionic surfactants satisfying the above requirements, especially preferred ones in this embodiment include the compound represented by General Formula (II), and the compounds (III)–(VIII) enumerated below.

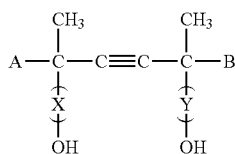

(II)

(In General Formula (II), A and B are independently $C_nH_{2n+1}$ (n is an integer of 1 to 10), and X and Y are an open-ring ethylene oxide unit and/or an open-ring propylene oxide unit.)

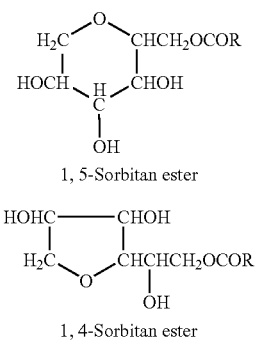

1, 5-Sorbitan ester (III)

1, 4-Sorbitan ester (IV)

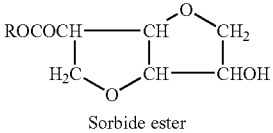

Sorbide ester (V)

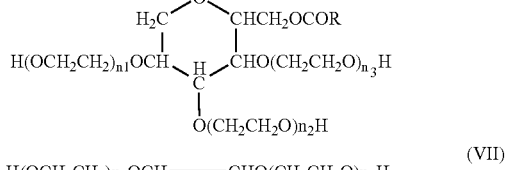

(VI)

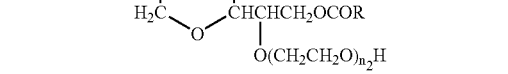

(VII)

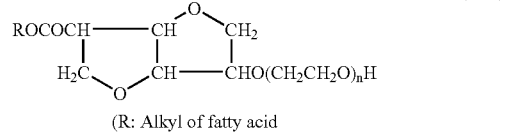

(VIII)

(R: Alkyl of fatty acid)

Of the nonionic surfactants represented by General Formula (II), particularly preferred are the compounds represented by General Formula (IX):

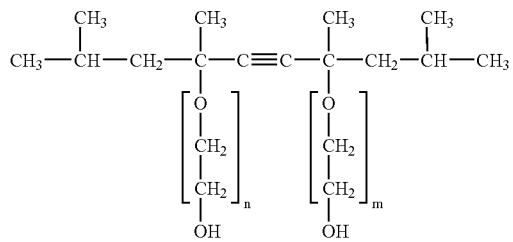

The symbols m and n are integers.

A further effect can be achieved in the fluorescent colored portion of the print by incorporating additionally a glycol compound having a vapor pressure not lower than that of diethylene glycol into the fluorescent ink of the second embodiment of the present invention described above.

The glycol compound having a vapor pressure not lower than that of diethylene glycol is preferably capable of dissolving or dispersing the first and second organic compounds incompatible with each other. For example, the compound has preferably a solubility parameter between the solubility parameters of the incompatible first and second organic compounds. The incorporation of such a compound into the ink of this embodiment improves further the color developability including fluorescence to improve remarkably the fluorescence and coloring ability of the prints, and to offset effectively the disadvantage of deterioration of fluorescence intensity by exposure of light. This compound depends on the two incompatible organic compounds. For example, in the case where the glycerin group-containing organic compound and a nonionic surfactant are employed as the two incompatible organic compounds, a glycol type compound is preferably used, including ethylene glycol (vapor pressure: 6.7 Pa at 20° C.) and diethylene glycol (vapor pressure: 1.33 Pa at 20° C.).

Figure 20:
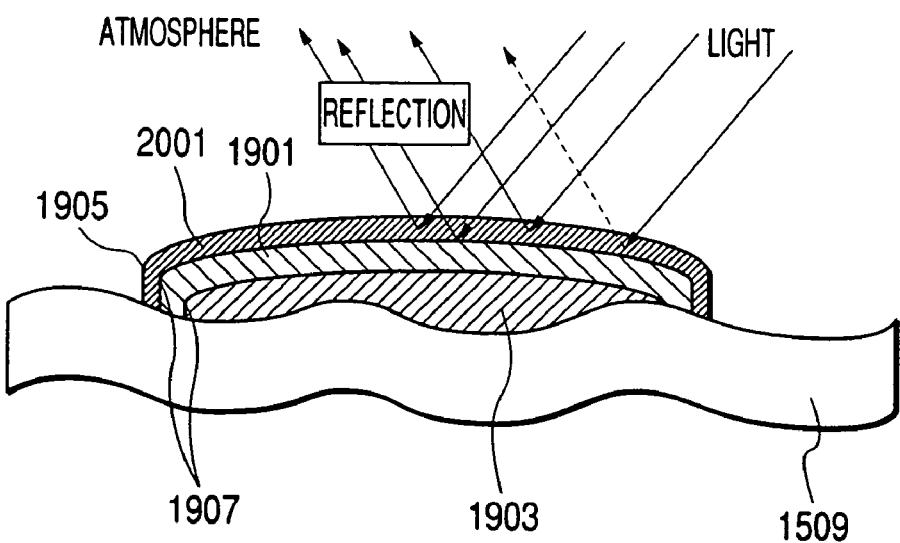
FIG. 20 is a drawing for explaining the mechanism of color development having the fluorescent intensity of the present invention.

Presumably this effect can be achieved by evaporation of the glycol compound having a vapor pressure not lower than that of diethylene glycol, or not lower than the vapor pressure of ethylene glycol or diethylene glycol, on the recording medium. Since such a compound evaporates relatively slowly, immediately after deposition of the ink on the recording medium, the compound is presumably contained in the ink in a sufficient amount. Therefore, the compound exists at the liquid-liquid interface 1907 between the layer 1901 and the layer 1903 shown in FIG. 19, or at least one of the liquid-liquid interface 1907 between the layers 2001 and 1901, and the liquid-liquid interface between the layers 1901 and 1903 shown in FIG. 20 to prevent formation of a definite interface. Therefore, immediately after the printing with this ink, the print gives lower fluorescence intensity than that given by the ink of the second embodiment not containing the compound. With lapse of time, the compound evaporates gradually to make the above liquid-liquid interface definite to form a structure of the recorded portion for giving high fluorescence intensity. Depending on the environment, fluorescence characteristic may deteriorate with time. However, the print formed with the ink of this embodiment is prevented effectively or nearly completely from deterioration with time in the apparent fluorescence intensity, or sometimes increases the fluorescence intensity. Therefore, fluorescence for a long term is required for the print, such a modified ink of the second embodiment is preferred.

The fluorescent ink of this embodiment is constituted of the aforementioned two organic compounds incompatible with each other, and the aforementioned combination of C.I. Acid Red 52 and a direct dye. The effects of the aforementioned mechanism can be achieved, particularly when C.I. Acid Red 52 is used. By the reasons mentioned before, the ink of this embodiment tends to give the effect with an aqueous system employing water as the liquid medium. Therefore, the coloring material may be a hydrophilic, water-soluble one, or may be a compound, or a coloring material, or combination thereof which is inherently hydrophobic and modified to be hydrophilic by surface treatment to be emulsifiable or apparently soluble in water.

In view of the stability of the ink, the fluorescent ink of this embodiment preferably contains a monohydric alcohol additionally. The monohydric alcohol produces a water-oil mixing effect, like water drainage of gasoline, which is preferably in stabilizing the ink in achieving the effect of the aforementioned mechanism. Moreover, the monohydric alcohol is effective for evaporation and for penetration into the recording medium to promote the effect of the present invention. The monohydric alcohol is contained in the ink at a content ranging preferably from 0.1 to 20 wt %, more preferably from 0.5 to 10 wt % based on the total weight of the ink. The monohydric alcohol useful as the ink component of the present invention includes ethanol, isopropanol, and n-butanol.

The fluorescent ink of this embodiment may contain a water-retaining agent. The water-retaining agent is preferably a compound selected from urea and urea derivatives. The incorporation of urea or a urea derivative in the ink improves the stability of the ink, preventing the mechanism of phase separation of the two incompatible organic compounds in the ink at the air-liquid ink interface. Further, the compound selected from urea and urea derivative can serve a co-solvent, which is advantageous also for the stability of the ink.

In the case where the recording medium is wood-free paper, for example, the water retainability of the wood-free paper promotes the effects of the mechanism of the present invention. Presumably, retention of water in the recording medium retards the discharge of the ink components into the recording medium and the atmospheric air to promote the phase separation into layers of the two incompatible organic compounds.

The urea derivative is preferably an acyclic compound, and is selected preferably from alkyl derivatives of urea, and ethylene-oxide and/or propylene-oxide adducts of urea, and compounds derived from two or more of the above derivatives. The selection depends on the kind and the amount of the components of the ink. The urea derivative is preferably water-soluble. The amount of the addition thereof is not specially limited, ranging preferably from 0.1 to 15 wt %, more preferably from 0.1 to 10 wt %.

The ink of this embodiment may contain further an additive such as a water-soluble organic solvent, a surfactant, a rust preventive, an antiseptic agent, a fungicide, an antioxidant, an reduction-preventing agent, an evaporation promotor, a chelating agent, a water-soluble polymer, and a pH adjustor.

The liquid medium for constituting the ink of the present invention together with the combination of the coloring materials, and the two organic compounds incompatible with each other is explained below. The liquid medium employed in the present invention is preferably mainly constituted of water. Use of a water-soluble organic solvent together with water can make the effect of the present invention remarkable.

The specific example of the water-soluble organic solvent useful for the fluorescent ink includes amides such as dimethylformamide, and dimethylacetamide; ketones such as acetone; ethers such as tetrahydrofuran, and dioxane; polyalkylene glycols such as polyethylene glycol, and polypropylene glycol; alkylene glycols having the alkylene of 2–6 carbon atoms such as ethylene glycol, propylene glycol, butylene glycol, triethylene glycol, 1,2,6-hexanetriol, thiodiglycol, hexylene glycol, and diethylene glycol; glycerin; lower alkyl ethers of a polyhydric alcohols such as ethylene glycol monomethyl (or monoethyl) ether, diethylene glycol monomethyl (or monoethyl) ether, and triethylene glycol monomethyl (or monoethyl) ether; cyclic amides such as N-methyl-2-pyrrolidone, and 1,3-dimethyl-2-imidazolidinone; triethanolamine; sulfolane; dimethyl sulfoxide; 2-pyrrolidone; $\epsilon$-caprolactam; and imides such as succinimide.

The fluorescent inks of the first or second embodiment of the present invention are useful for common writing utensils, but are particularly useful for ink-jet recording. The ink-jet recording method includes a method of recording by application of dynamic energy to the ink to eject ink droplets, and a method of recording by application of thermal energy to cause bubbling to eject ink droplets. The fluorescent ink of the present invention is particularly useful for the ink-jet recording method.

An example of the ink-jet recording apparatus of the present invention is described below which is suitable for printing with the fluorescent ink of the present invention.

Figure 2:
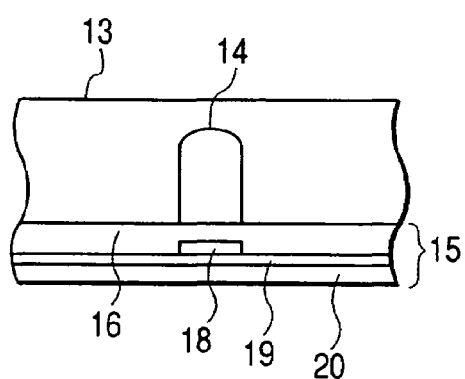
FIG. 2 is a lateral sectional view of the head of an ink-jet recording apparatus.

FIG. 1 is a sectional view of a head 13 along an ink flow path. FIG. 2 is a sectional view of the head taken along line 2—2 in FIG. 1.

The head 13 is constructed by bonding a plate of glass, ceramics, silicon, plastics, or the like having a flow path (nozzle) 14 for ink flow with a heater element substrate 15 for thermal recording. The heater element substrate 15 is constituted of a protection layer 16 formed from silicon oxide, silicon nitride, silicon carbide, or the like; electrodes 17-1, 17-2 formed from aluminum, gold, aluminum-copper alloy, or the like; a heating resistor layer 18 formed from a high melting material such as $HfB_2$, TaN, and TaAl; a heat-accumulating layer 19 formed from thermally oxidized silicon, aluminum oxide, or the like; and a substrate 20 made of a heat-radiating material such as silicon, aluminum, and aluminum nitride.

On application of an electric signal in a pulse state to the electrodes 17-1, 17-2 of the head, the region denoted by a symbol "n" on the heater element substrate 15 generates heat abruptly to form a bubble in the ink 21 on the surface of the heater element substrate, the pressure of the bubble pushes out the meniscus 23 to eject the ink 21 through the nozzle 14 and the orifice 22 in a shape of droplets 24. The ejected ink droplets jump onto a recording sheet 25.

Figure 3:
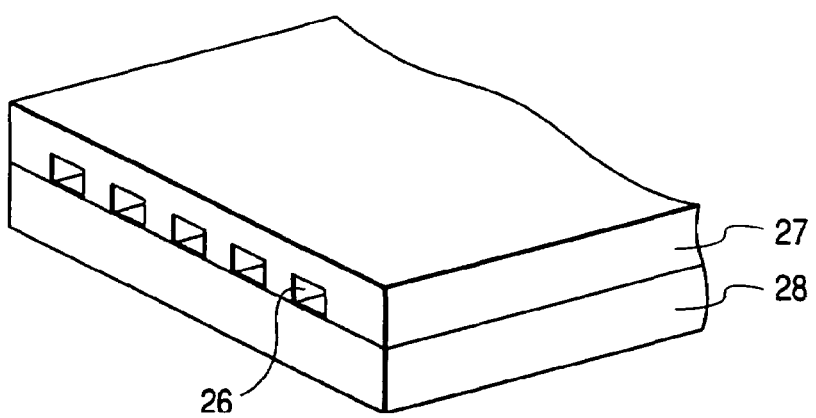
FIG. 3 is a perspective external view of a multiple head having the head shown in FIG. 1 in juxtaposition.

FIG. 3 shows an external appearance of a multiple head having plural heads shown in FIG. 1 in juxtaposition. The multiple head is formed by bonding a glass plate 27 having multiple nozzles 26 with a heat-generating head 28 like the one shown in FIG. 1.

Figure 4:
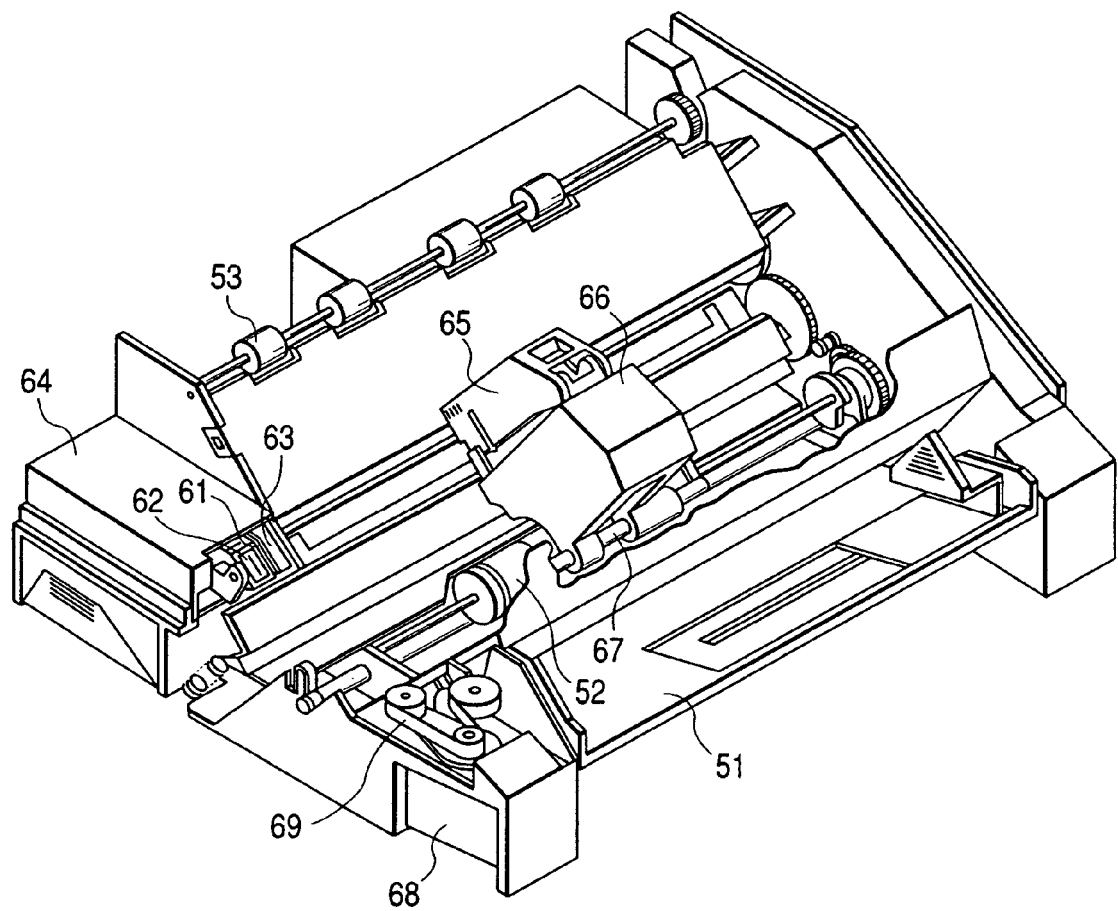
FIG. 4 is a schematic perspective view of an ink-jet recording apparatus.

FIG. 4 shows an example of the entire appearance of the ink-jet recording apparatus equipped with the above-described head. In FIG. 4, a blade 61 as a wiping member is held at one end of the blade by a blade-holding member, forming a fixed end in a shape of a cantilever. The blade 61 is placed at a position adjacent to the recording region of the recording head, and, in this example, is held so as to protrude into the moving path of the recording head.

A cap 62 is placed at a home position adjacent to the blade 61, and is constituted such that it moves in the direction perpendicular to the moving direction of the recording head to come into contact with the ejection nozzle face to cap the nozzle. An ink absorbent 63 is placed at a position adjacent to the blade 61, and is held so as to protrude into the moving path of the recording head 65 in a manner similar to that of the blade 61. The blade 61, the cap 62, and the ink absorbent 63 constitute an ejection recovery device 64. The blade 61, and the ink absorbent 63 serve to remove off water, dust, and the like from the face of the ink ejection nozzle.

A recording head 65 has an energy-generating means for the ejection, and conducts recording by ejecting the ink onto a recording medium opposing to the ejection nozzle face. A carriage 66 is provided for supporting and moving the recording head 65. The carriage 66 is engaged slidably with a guide rod 67. A portion of the carriage 66 is connected (not shown in the drawing) to a belt 69 driven by a motor 68, so that the carriage 66 is movable along the guide rod 67 to the recording region of the recording head 65 and the adjacent region thereto. A paper sheet delivery device 51 for delivery of a recording medium and a paper sheet delivery roller 52 driven by a motor (not shown in the drawing) delivers a recording medium to the position opposing to the ejection nozzle face of the recording head.

With the above constitution, the recording medium is delivered with the progress of the recording, and is delivered further to a paper discharge device provided with paper sheet-discharging rollers 53. In the above constitution, when the recording head 65 returns to the home position on completion of recording, the cap 62 of the ejection-recovery device 64 is positioned out of the moving path of the recording head 65, and the blade 61 is allowed to protrude to the moving path. Thereby, the ejecting nozzle face of the recording head 65 is wiped.

For capping the ejection face of the recording head 65, the cap 62 protrudes toward the moving path of the recording head to come into contact with the ejection nozzle face. When the recording head 65 is moved from the home position to the record-starting position, the cap 62 and the blade 61 are at the same position as in the above-mentioned wiping step, so that the ejection nozzle face of the recording head 65 is wiped also in this movement. The recording head is moved to the home position not only at the completion of the recording and at the time of ejection recovery, but is also moved at predetermined intervals during recording from the recording region. The nozzle is wiped by this movement.

Figure 5:
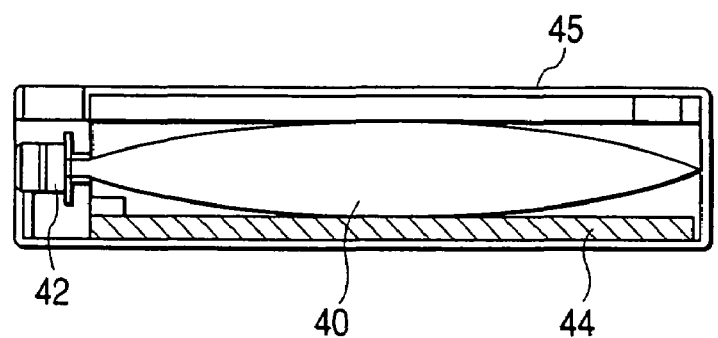
FIG. 5 is a vertical sectional view of an ink cartridge.

FIG. 5 is a sectional view of an example of an ink cartridge 45 which holds an ink to be supplied through an ink supplying member such as a tube. An ink container 40, for example, an ink bag, contains an ink to be supplied, and has a rubber plug 42 at the tip. Insertion of a needle (not shown in the drawing) into the plug 42 enables supply of the ink from the ink bag 40 to the head. A waste-ink absorbent 44 serves to absorb a waste ink. The liquid-contacting face of the ink container is preferably formed from polyolefin, especially polyethylene, in the present invention.

Figure 6:
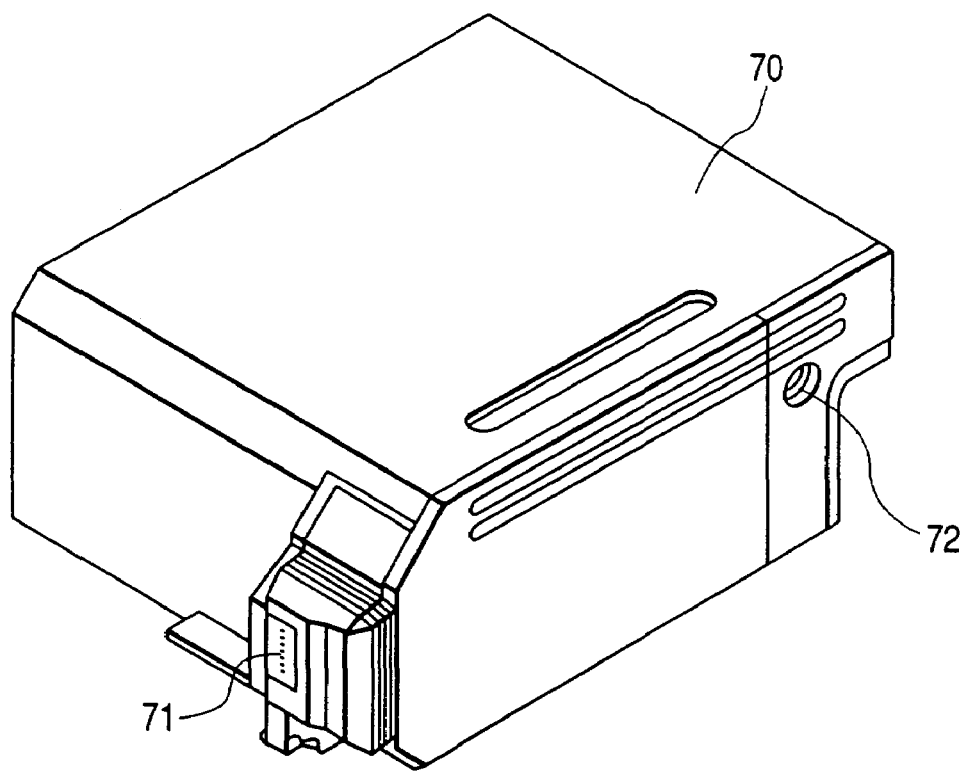
FIG. 6 is a perspective view of a recording unit.

The ink-jet recording apparatus used in the present invention is not limited to the above-mentioned one which has separately a head and an ink cartridge. Integration thereof as shown in FIG. 6 may suitably be employed. In FIG. 6, a recording unit 70 houses an ink holding member such as an ink absorbent, and the ink in the absorbent is ejected from a plurality of orifices of a head 71. The ink absorbent may comprise an inorganic compound, and the ink absorbent may preferably comprise at least one of polyurethane, cellulose, polyvinylacetate, polyolefins etc. Furthermore, the ink absorbent may have a porous structure. The ink absorbent may have a multi-layer structure. In the case that the ink absorbent has a multi-layer structure, the direction of the multi-layer arrangement of the multi-layer structure may preferably be aligned in an ink discharging direction of the ink container. Furthermore, the ink absorbent may be a fiber flocculate, and such a fiber flocculate may preferably be aligned in an ink discharging direction of the ink container. In any case as described above, the ink absorbent may preferably have a face being in contact with the ink container. The ink-holding member may be of a structure of an ink bag having a spring inside without employing the ink absorbent. An air-communication opening 72 is provided for communication of the cartridge interior with the open air. The recording unit 70 may be used in place of the recording head 65 shown in FIG. 4, and is made to be mountable to and demountable from the carriage 66.

In another example of the ink-jet recording apparatus which utilizes a dynamic energy, an on-demand ink-jet recording head is employed. The on-demand ink-jet recording head comprises a nozzle-holding substrate having plural nozzles, and a pressure-generating element constituted of a piezo-electric material opposing to the nozzles and an electroconductive material, and is filled with an ink around the pressure-generating element. By application of a voltage, the pressure-generating element is displaced to eject the ink droplets through the nozzles.

Figure 7:
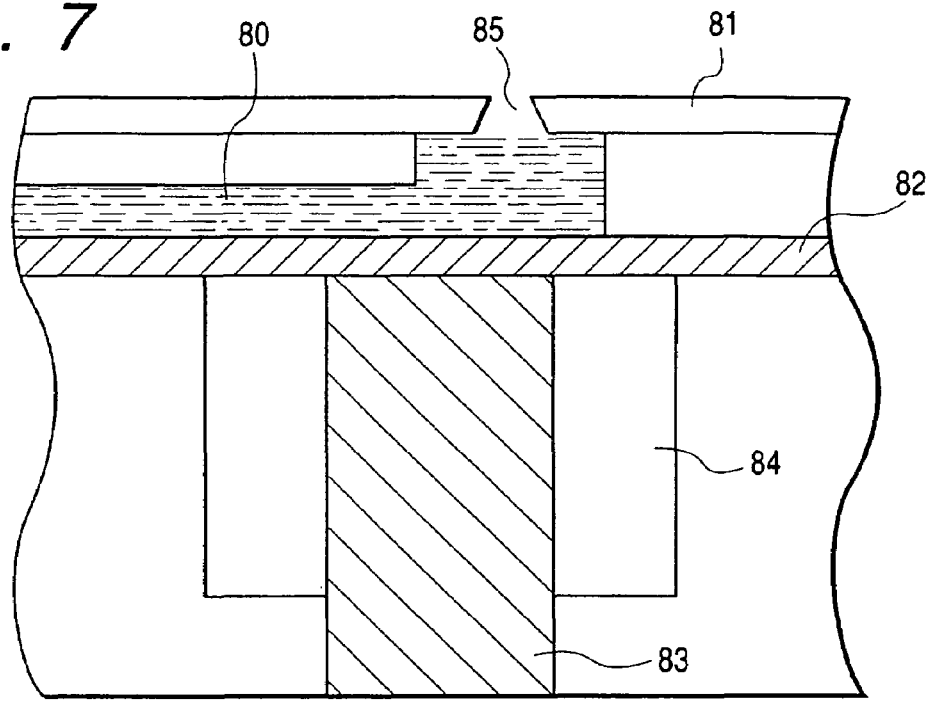
FIG. 7 is a schematic sectional view showing constitution of another ink-jet recording head.

FIG. 7 shows an example of the constitution of the recording head which is the main portion of the recording apparatus. This head is constituted of an ink flow path 80 communicating with an ink chamber (not shown in the drawing), an orifice plate 81 for ejecting a prescribed volume of the ink droplets, a vibration plate 82 for exerting pressure directly to the ink, a piezo-electric element 83 joined to the vibration plate 82 and displacing in response to electric signals, and a substrate 84 for fixing the orifice plate 81, the vibration plate 82, and so forth.

In FIG. 7, the ink flow path 80 is formed from a photosensitive resin, or a like material. An ejection orifice 85 is formed through the orifice plate 81 from a metal such as stainless steel, and nickel by boring by electrocasting or press working, or like processing. The vibration plate 82 is formed from a film of a metal such as stainless steel, nickel, and titanium, or a film of high-elasticity resin. The piezoelectric element 83 is made from a dielectric material such as barium titanate, and PZT. In the recording head of the above constitution, pulsed voltage is applied to the piezo-electric element 83 to cause deformation stress therein to deform the vibration plate joined to the piezo-electric element 83, whereby the ink in the ink flow path 80 is pressurized vertically to eject ink droplets (not shown in the drawing) to conduct recording. Such a recording head can be used by incorporation into a recording apparatus similar to that shown in FIG. 4. The recording apparatus with such a recording head may be driven in the same manner as described before.

EXAMPLES

The present invention is explained more specifically by reference to examples and comparative examples. The percentage (%) hereinafter is based on weight unless otherwise mentioned.

Examples I

Examples I-1 to I-21 and Comparative Examples I-1 to I-21 were conducted for the first embodiment of the present invention.

The respective inks of Examples and Comparative Examples were prepared by mixing and dissolving the components shown below, filtering the resulting solution with pressure through a membrane filter of a pore size of 0.2 μm. Tables 1 and 2 summarize the coloring materials and the ratio thereof constituting the ink of the Examples and Comparative Examples. The supplementary dyes combinedly used with C.I. Acid Red 52 were selected from those having the values of $a^*$ ranging from −20 to 60, $b^*$ ranging from −5 to 60, and $\sqrt{(a^2+b^2)}$ of 30 or more.

Example I-1

| | |
|---|---|
| Acid Red 52 | 0.1% |
| Direct Yellow 142 | 0.15% |
| Thiodiglycol | 10.0% |
| Glycerin | 7.5% |
| Pure water | 82.25% |

Example I-2

| | |
|---|---|
| Acid Red 52 | 0.2% |
| Direct Red 227 | 0.3% |
| 2-Pyrrolidone | 7.0% |
| Glycerin | 5.0% |
| Urea | 7.0% |
| Pure water | 80.5% |

Example I-3

| | |
|---|---|
| Acid Red 52 | 0.27% |
| Direct Red 80 | 0.02% |
| Direct Yellow 132 | 0.1% |
| Glycerin | 7.5% |
| Diethylene glycol | 5.0% |
| Isopropylene glycol | 3.0% |
| Pure water | 84.11% |

Example I-4

| | |
|---|---|
| Acid Red 52 | 0.25% |
| Direct Red 80 | 0.15% |
| Direct Yellow 86 | 0.15% |
| Thiodiglycol | 10.0% |
| Glycerin | 7.5% |
| Pure water | 81.95% |

Example I-5

| | |
|---|---|
| Acid Red 52 | 0.25% |
| Direct Red 227 | 0.35% |
| Thiodiglycol | 10.0% |
| Glycerin | 7.5% |
| Triethylene glycol | 3.0% |
| Pure water | 78.9% |

Example I-6

| | |
|---|---|
| Acid Red 52 | 0.25% |
| Direct Red 227 | 0.4% |
| Ethylene glycol | 8.0% |
| Glycerin | 6.0% |
| Triethylene glycol | 3.0% |
| Ethanol | 5.0% |
| Pure water | 77.35% |

Example I-7

| | |
|---|---|
| Acid Red 52 | 0.3% |
| Direct Yellow 132 | 0.25% |
| Direct Blue 199 | 0.05 |
| Glycerin | 7.5% |
| Diethylene glycol | 5.0% |
| Isopropylene glycol | 3.0% |
| Pure water | 83.9% |

Example I-8

| | |
|---|---|
| Acid Red 52 | 0.4% |
| Direct Blue 199 | 0.16% |
| Thiodiglycol | 10.0% |
| Glycerin | 7.5% |
| Triethylene glycol | 3.0% |
| Pure water | 78.94% |

Example I-9

| | |
|---|---|
| Acid Red 52 | 0.25% |
| Direct Red 80 | 0.05% |
| Direct Yellow 86 | 0.3% |
| Thiodiglycol | 10.0% |
| Glycerin | 7.5% |
| Pure water | 81.9% |

Example I-10

| | |
|---|---|
| Acid Red 52 | 0.25% |
| Direct Red 80 | 0.05% |
| Exemplified Dye 1 | 0.3% |
| Thiodiglycol | 10.0% |
| Glycerin | 7.5% |
| Triethylene glycol | 3.0% |
| Pure water | 78.9% |

Example I-11

| | |
|---|---|
| Acid Red 52 | 0.25% |
| Direct Red 80 | 0.1% |
| Exemplified Dye 2 | 0.3% |
| Ethylene glycol | 8.0% |
| Glycerin | 6.0% |
| Triethylene glycol | 3.0% |
| Ethanol | 5.0% |
| Pure water | 77.35% |

Example I-12

| | |
|---|---|
| Acid Red 52 | 0.3% |
| Direct Yellow 132 | 0.25% |
| Direct Red 80 | 0.05% |
| Glycerin | 7.5% |
| Diethylene glycol | 5.0% |
| Isopropylene glycol | 3.0% |
| Pure water | 83.9% |

Example I-13

| | |
|---|---|
| Acid Red 52 | 0.4% |
| Direct Yellow 142 | 0.16% |
| Thiodiglycol | 10.0% |
| Glycerin | 7.5% |
| Triethylene glycol | 3.0% |
| Pure water | 78.94% |

Example I-14

| | |
|---|---|
| Acid Red 52 | 0.1% |
| Exemplified Dye 1 | 0.15% |
| Thiodiglycol | 10.0% |
| Glycerin | 7.5% |
| Pure water | 82.25% |

Example I-15

| | |
|---|---|
| Acid Red 52 | 0.2% |
| Exemplified Dye 3 | 0.3% |
| 2-Pyrrolidone | 7.0% |
| Glycerin | 5.0% |
| Urea | 7.0% |
| Pure water | 80.5% |

Example I-16

| | |
|---|---|
| Acid Red 52 | 0.25% |
| Exemplified Dye 1 | 0.1% |
| Exemplified Dye 2 | 0.05% |
| Glycerin | 7.5% |
| Diethylene glycol | 5.0% |
| Isopropylene glycol | 3.0% |
| Pure water | 84.1% |

Example I-17

| | |
|---|---|
| Acid Red 52 | 0.25% |
| Exemplified Dye 1 | 0.3% |
| Thiodiglycol | 10.0% |
| Glycerin | 7.5% |
| Pure water | 81.95% |

Example I-18

| | |
|---|---|
| Acid Red 52 | 0.25% |
| Exemplified Dye 2 | 0.35% |
| Thiodiglycol | 10.0% |
| Glycerin | 7.5% |
| Triethylene glycol | 3.0% |
| Pure water | 78.9% |

Example I-19

| | |
|---|---|
| Acid Red 52 | 0.25% |
| Exemplified Dye 5 | 0.4% |
| Ethylene glycol | 8.0% |

-continued

| | |
|---|---|
| Glycerin | 6.0% |
| Triethylene glycol | 3.0% |
| Ethanol | 5.0% |
| Pure water | 77.35% |

Example I-20

| | |
|---|---|
| Acid Red 52 | 0.3% |
| Exemplified Dye 1 | 0.1% |
| Exemplified Dye 2 | 0.1% |
| Exemplified Dye 7 | 0.1% |
| Glycerin | 7.5% |
| Diethylene glycol | 5.0% |
| Isopropylene glycol | 3.0% |
| Pure water | 83.9% |

Example I-21

| | |
|---|---|
| Acid Red 52 | 0.4% |
| Exemplified Dye 2 | 0.16% |
| Thiodiglycol | 10.0% |
| Glycerin | 7.5% |
| Triethylene glycol | 3.0% |
| Pure water | 78.94% |

TABLE 1

COLORING MATERIAL COMPOSITION OF THE INK IN EXAMPLES 1–21

| Example No. | C.I. Acid Red 52 (wt %) (A) | Supplementary coloring material Type | Content (wt %) (B) | Ratio of (B):(A) |
|---|---|---|---|---|
| I-1 | 0.1 | Direct Yellow 142 | 0.15 | 1.5 |
| I-2 | 0.2 | Direct Red 227 | 0.3 | 1.5 |
| I-3 | 0.27 | Direct Red 80 & | 0.02 | 0.48 |
| | | Direct Yellow 132 | 0.1 | |
| I-4 | 0.25 | Direct Red 80 & | 0.15 | 1.2 |
| | | Direct Yellow 86 | 0.15 | |
| I-5 | 0.25 | Direct Red 227 | 0.35 | 1.4 |
| I-6 | 0.25 | Direct Red 227 | 0.4 | 1.6 |
| I-7 | 0.3 | Direct Yellow 132 & | 0.25 | 1.0 |
| | | Direct Blue 199 | 0.05 | |
| I-8 | 0.4 | Direct Blue 199 | 0.16 | 0.4 |
| I-9 | 0.25 | Direct Red 80 & | 0.05 | 1.4 |
| | | Direct Yellow 86 | 0.3 | |
| I-10 | 0.25 | Direct Red 80 & | 0.05 | 1.4 |
| | | Exemplified Dye 1 | 0.3 | |
| I-11 | 0.25 | Direct Red 80 & | 0.1 | 1.6 |
| | | Exemplified Dye 2 | 0.3 | |
| I-12 | 0.3 | Direct Yellow 132 & | 0.25 | 1.0 |
| | | Direct Red 80 | 0.05 | |
| I-13 | 0.4 | Direct Yellow 142 | 0.16 | 0.4 |
| I-14 | 0.1 | Exemplified Dye 1 | 0.15 | 1.5 |
| I-15 | 0.2 | Exemplified Dye 3 | 0.3 | 1.5 |
| I-16 | 0.25 | Exemplified Dye 1 & | 0.1 | 0.6 |
| | | Exemplified Dye 2 | 0.05 | |
| I-17 | 0.25 | Exemplified Dye 1 | 0.3 | 1.2 |
| I-18 | 0.25 | Exemplified Dye 2 | 0.35 | 1.4 |
| I-19 | 0.25 | Exemplified Dye 5 | 0.4 | 1.6 |
| I-20 | 0.3 | Exemplified Dye 1 | 0.1 | 1.0 |
| | | Exemplified Dye 2 & | 0.1 | |
| | | Exemplified Dye 7 | 0.1 | |
| I-21 | 0.4 | Exemplified Dye 2 | 0.16 | 0.4 |

Comparative Example I-1

| | |
|---|---|
| Acid Red 52 | 0.3% |
| Thiodiglycol | 10.0% |
| Glycerin | 7.5% |
| Pure water | 82.2% |

Comparative Example I-2

| | |
|---|---|
| Acid Red 52 | 0.2% |
| Solvent Green 7 | 0.3% |
| Glycerin | 7.5% |
| Diethylene glycol | 5.0% |
| Isopropylene glycol | 3.0% |
| Pure water | 84.0% |

Comparative Example I-3

| | |
|---|---|
| Acid Red 52 | 0.3% |
| Acid Yellow 23 | 0.25% |
| Glycerin | 7.5% |
| Diethylene glycol | 5.0% |
| Isopropylene glycol | 3.0% |
| Pure water | 83.95% |

Comparative Example I-4

| | |
|---|---|
| Acid Red 52 | 0.08% |
| Direct Yellow 142 | 0.15% |
| Thiodiglycol | 10.0% |
| Glycerin | 7.5% |
| Pure water | 82.27% |

Comparative Example I-5

| | |
|---|---|
| Acid Red 52 | 0.3% |
| Direct Red 80 | 0.05% |
| Direct Yellow 86 | 0.05% |
| Glycerin | 7.5% |
| Diethylene glycol | 5.0% |
| Isopropylene glycol | 3.0% |
| Pure water | 84.1% |

Comparative Example I-6

| | |
|---|---|
| Acid Red 52 | 0.25% |
| Direct Yellow 132 | 0.45% |
| Ethylene glycol | 8.0% |
| Glycerin | 6.0% |

-continued

| | |
|---|---|
| Triethylene glycol | 3.0% |
| Ethanol | 5.0% |
| Pure water | 77.3% |

Comparative Example I-7

| | |
|---|---|
| Acid Red 52 | 0.45% |
| Direct Yellow 132 | 0.3% |
| Glycerin | 7.5% |
| Diethylene glycol | 5.0% |
| Isopropylene glycol | 3.0% |
| Pure water | 83.75% |

Comparative Example I-8

| | |
|---|---|
| Acid Red 52 | 0.25% |
| Direct Red 227 | 0.5% |
| Thiodiglycol | 10.0% |
| Glycerin | 7.5% |
| Triethylene glycol | 3.0% |
| Pure water | 78.75% |

Comparative Example I-9

| | |
|---|---|
| Acid Red 52 | 0.1% |
| Direct Yellow 142 | 0.1% |
| Diethylene glycol | 8.0% |
| Glycerin | 6.0% |
| Triethylene glycol | 3.0% |
| Ethanol | 5.0% |
| Pure water | 77.8% |

Comparative Example I-10

| | |
|---|---|
| Acid Red 52 | 0.2% |
| Direct Red 227 | 0.35% |
| 2-Pyrrolidone | 7.0% |
| Glycerin | 5.0% |
| Urea | 7.0% |
| Pure water | 80.45% |

Comparative Example I-11

| | |
|---|---|
| Acid Red 52 | 0.25% |
| Direct Red 80 | 0.2% |
| Exemplified Dye 2 | 0.25% |
| Ethylene glycol | 8.0% |
| Glycerin | 6.0% |
| Triethylene glycol | 3.0% |

-continued

| | |
|---|---|
| Ethanol | 5.0% |
| Pure water | 77.3% |

Comparative Example I-12

| | |
|---|---|
| Acid Red 52 | 0.45% |
| Direct Yellow 132 | 0.25% |
| Direct Red 80 | 0.05% |
| Glycerin | 7.5% |
| Diethylene glycol | 5.0% |
| Isopropylene glycol | 3.0% |
| Pure water | 83.75% |

Comparative Example I-13

| | |
|---|---|
| Acid Red 52 | 0.08% |
| Exemplified Dye 1 | 0.15% |
| Thiodiglycol | 10.0% |
| Glycerin | 7.5% |
| Pure water | 82.27% |

Comparative Example I-14

| | |
|---|---|
| Acid Red 52 | 0.25% |
| Exemplified Dye 1 | 0.05% |
| Exemplified Dye 2 | 0.05% |
| Glycerin | 7.5% |
| Diethylene glycol | 5.0% |
| Isopropylene glycol | 3.0% |
| Pure water | 84.15% |

Comparative Example I-15

| | |
|---|---|
| Acid Red 52 | 0.3% |
| Exemplified Dye 5 | 0.45% |
| Ethylene glycol | 8.0% |
| Glycerin | 6.0% |
| Triethylene glycol | 3.0% |
| Ethanol | 5.0% |
| Pure water | 77.25% |

Comparative Example I-16

| | |
|---|---|
| Acid Red 52 | 0.45% |
| Exemplified Dye 7 | 0.3% |
| Glycerin | 7.5% |
| Diethylene glycol | 5.0% |
| Isopropylene glycol | 3.0% |
| Pure water | 83.75% |

Comparative Example I-17

| | |
|---|---|
| Acid Red 52 | 0.25% |
| Exemplified Dye 2 | 0.5% |
| Thiodiglycol | 10.0% |
| Glycerin | 7.5% |
| Triethylene glycol | 3.0% |
| Pure water | 78.75% |

Comparative Example I-18

| | |
|---|---|
| Acid Red 52 | 0.1% |
| Exemplified Dye 9 | 0.2% |
| Diethylene glycol | 8.0% |
| Glycerin | 6.0% |
| Triethylene glycol | 3.0% |
| Ethanol | 5.0% |
| Pure water | 77.7% |

Comparative Example I-19

| | |
|---|---|
| Acid Red 52 | 0.2% |
| Exemplified Dye 3 | 0.35% |
| 2-Pyrrolidone | 7.0% |
| Glycerin | 5.0% |
| Urea | 7.0% |
| Pure water | 80.45% |

Comparative Example I-20

| | |
|---|---|
| Acid Red 52 | 0.2% |
| Direct Red 227 | 0.35% |
| 2-Pyrrolidone | 7.0% |
| Ethanol | 5.0% |
| Urea | 7.0% |
| Pure water | Balance |

Comparative Example I-21

| | |
|---|---|
| Acid Red 52 | 0.25% |
| Direct Red 80 | 0.1% |
| Direct Yellow 86 | 0.05% |
| Glycerin | 7.5% |
| Diethylene glycol | 5.0% |
| Isopropylene glycol | 3.0% |
| Pure water | Balance |

TABLE 2

COLORING MATERIAL COMPOSITION OF THE INK IN COMPARATIVE EXAMPLES 1–21

| Comparative Example No. | C.I. Acid Red 52 (wt %) (A) | Supplementary coloring material Type | Content (wt %) (B) | Ratio of (B):(A) |
|---|---|---|---|---|
| I-1 | 0.3 | — | — | — |
| I-2 | 0.2 | Solvent Green 7 | 0.3 | 1.5 |
| I-3 | 0.3 | Acid Yellow 23 | 0.25 | 0.83 |
| I-4 | 0.08 | Direct Yellow 142 | 0.15 | 1.88 |
| I-5 | 0.3 | Direct Red 80 & Direct Yellow 86 | 0.05 0.05 | 0.33 |
| I-6 | 0.25 | Direct Yellow 132 | 0.45 | 1.8 |
| I-7 | 0.45 | Direct Yellow 132 | 0.30 | 0.67 |
| I-8 | 0.25 | Direct Red 227 | 0.5 | 2.0 |
| I-9 | 0.1 | Direct Yellow 142 | 0.1 | 1.0 |
| I-10 | 0.2 | Direct Red 227 | 0.35 | 1.75 |
| I-11 | 0.25 | Direct Red 80 & Exemplified Dye 2 | 0.2 0.25 | 1.8 |
| I-12 | 0.45 | Direct Yellow 132 & Direct Red 80 | 0.25 0.05 | 0.67 |
| I-13 | 0.08 | Exemplified Dye 1 | 0.15 | 1.88 |
| I-14 | 0.25 | Exemplified Dye 1 & Exemplified Dye 2 | 0.05 0.05 | 0.4 |
| I-15 | 0.3 | Exemplified Dye 5 | 0.45 | 1.5 |
| I-16 | 0.45 | Exemplified Dye 7 | 0.3 | 0.67 |
| I-17 | 0.25 | Exemplified Dye 2 | 0.5 | 2.0 |
| I-18 | 0.1 | Exemplified Dye 9 | 0.2 | 2.0 |
| I-19 | 0.2 | Exemplified Dye 3 | 0.35 | 1.75 |
| I-20 | 0.2 | Direct Red 227 | 0.35 | 1.75 |
| I-21 | 0.25 | Direct Red 80 & Direct Yellow 86 | 0.1 0.05 | 0.6 |

<Evaluation>

Printing was conducted with the inks of Examples I-1 to I-21 and Comparative Examples I-1 to I-21, and the formed prints were evaluated for the items below.

(Evaluation 1: Water Resistance)

On plain paper (commercial acidic paper), alphabet and numeral characters were printed by means of an ink-jet recording apparatus BJC-4000 (manufactured by Canon Inc.) having an on-demand type multiple recording head which ejects ink by application of thermal energy to the ink in correspondence with recording signals. The prints were left standing for one hour or longer. Then water was dropped on the printed characters. After drying, the state of the printed characters was visually examined and evaluated according to the evaluation standard shown below. Tables 3 and 4 show the results.

A: The print is definitely decipherable.
B: The print is slightly thin, but is decipherable.
C: The print is recognizable, but not decipherable.
D: The print is completely erased.

(Evaluation 2: Fluorescence Intensity)

On plain paper (commercial acidic paper), 50%-grid pattern was printed by means of an ink-jet recording apparatus BJC-4000 (manufactured by Canon Inc.) having an on-demand type multiple recording head which ejects ink by application of thermal energy to the ink in correspondence with recording signals. The fluorescence intensity was measured at the maximum fluorescence wavelength with the excitation at wavelength of 263 nm by means of a fluorometer (FP-750, manufactured by Nippon Bunko K.K.). The measured fluorescence intensity values were normalized by taking the fluorescence intensity of Comparative Example 1 as 100. The normalized fluorescence intensities were evaluated according to the standard below. Tables 3 and 4 show the results.

A: The normalized intensity is 80 or higher.
B: The normalized intensity ranges from 60 to 79.
C: The normalized intensity ranges from 50 to 59.
D: The normalized intensity is 49 or lower.

TABLE 3

Evaluation Results of Examples I-1 to I-21

| Example No. | Water resistance | Fluorescence intensity |
|---|---|---|
| I-1 | B | B |
| I-2 | B | B |
| I-3 | B | A |
| I-4 | B | A |
| I-5 | B | A |
| I-6 | B | B |
| I-7 | B | A |
| I-8 | B | B |
| I-9 | B | A |
| I-10 | A | A |
| I-11 | A | B |
| I-12 | B | A |
| I-13 | B | B |
| I-14 | B | B |
| I-15 | A | A |
| I-16 | B | A |
| I-17 | A | A |
| I-18 | A | A |
| I-19 | A | B |
| I-20 | A | A |
| I-21 | B | B |

TABLE 4

Evaluation Results of Comparative Examples I-1 to I-21

| Comparative Example No. | Water resistance | Fluorescence intensity |
|---|---|---|
| I-1 | D | — |
| I-2 | D | B |
| I-3 | D | B |
| I-4 | B | C |
| I-5 | C | A |
| I-6 | A | C |
| I-7 | B | C |
| I-8 | A | D |
| I-9 | C | B |
| I-10 | B | C |
| I-11 | A | C |
| I-12 | B | C |
| I-13 | B | C |
| I-14 | C | A |
| I-15 | A | C |
| I-16 | A | C |
| I-17 | A | D |
| I-18 | A | D |
| I-19 | A | C |
| I-20 | A | C |
| I-21 | C | A |

(Note:
Above Comparative Examples I-20 and I-21 correspond to Comparative Examples II-10 and II-21.)

Examples II

Examples II-1 to II-21 and Comparative Examples II-1 to II-21 were conducted for the second embodiment of the present invention.

The respective inks of Examples and Comparative Examples were prepared by mixing and dissolving the components shown below, filtering the resulting solution with pressure through a membrane filter of a pore size of 0.2 µm. Table 5 summarizes the coloring materials and the ratio thereof constituting the ink of the Example and Comparative Examples. The nonionic surfactant having the above described Formula (VIII) was used in the Examples. The HLB value varies depending on the value of n+m in the Formula (VIII). The HLB value of the nonionic surfactant used is indicated in Table 5.

Example II-1

| | |
|---|---|
| Acid Red 52 | 0.1% |
| Direct Yellow 142 | 0.15% |
| Thiodiglycol | 10.0% |
| Glycerin | 7.5% |
| Compound of General Formula (II) | 2.0% |
| (A and B: $C_4H_7$, X: $(C_2H_4O)_n$, Y: $(C_2H_4O)_m$, n + m = 10) | |
| Pure water | Balance |

Example II-2

| | |
|---|---|
| Acid Red 52 | 0.2% |
| Direct Red 227 | 0.3% |
| 2-Pyrrolidone | 7.0% |
| Glycerin | 8.0% |
| Ethanol | 5.0% |
| Urea | 7.0% |
| Compound of General Formula (II) | 2.0% |
| (A and B: $C_4H_7$, X: $(C_2H_4O)_n$, Y: $(C_2H_4O)_m$, n + m = 10) | |
| Compound of General Formula (II) | 0.1% |
| (A and B: $C_4H_7$, X: $(C_2H_4O)_n$, Y: $(C_2H_4O)_m$, n + m = 5) | |
| Pure water | Balance |

Example II-3

| | |
|---|---|
| Acid Red 52 | 0.25% |
| Direct Red 80 | 0.1% |
| Direct Yellow 86 | 0.05% |
| Glycerin | 7.5% |
| Diethylene glycol | 5.0% |
| Isopropylene glycol | 3.0% |
| Compound of General Formula (II) | 1.0% |
| (A and B: $C_4H_7$, X: $(C_2H_4O)_n$, Y: $(C_2H_4O)_m$, n + m = 10) | |
| Compound of General Formula (II) | 0.1% |
| (A and B: $C_4H_7$, X: $(C_2H_4O)_n$, Y: $(C_2H_4O)_m$, n + m = 5) | |
| Pure water | Balance |

Example II-4

| | |
|---|---|
| Acid Red 52 | 0.25% |
| Direct Red 80 | 0.15% |
| Direct Yellow 86 | 0.15% |
| Thiodiglycol | 10.0% |
| Glycerin | 7.5% |
| Compound of General Formula (II) | 1.5% |
| (A and B: $C_4H_7$, X: $(C_2H_4O)_n$, Y: $(C_2H_4O)_m$, n + m = 10) | |
| Pure water | Balance |

Example II-5

| | |
|---|---|
| Acid Red 52 | 0.25% |
| Direct Red 227 | 0.35% |
| Thiodiglycol | 10.0% |
| Glycerin | 7.5% |
| Compound of General Formula (II) | 2.5% |
| (A and B: $C_4H_7$, X: $(C_2H_4O)_n$, Y: $(C_2H_4O)_m$, n + m = 10) | |
| Triethylene glycol | 3.0% |
| Pure water | Balance |

Example II-6

| | |
|---|---|
| Acid Red 52 | 0.25% |
| Direct Red 227 | 0.4% |
| Ethylene glycol | 8.0% |
| Glycerin | 6.0% |
| Triethylene glycol | 3.0% |
| Ethanol | 5.0% |
| Compound of General Formula (II) | 2.0% |
| (A and B: $C_4H_7$, X: $(C_2H_4O)_n$, Y: $(C_2H_4O)_m$, n + m = 10) | |
| Pure water | Balance |

Example II-7

| | |
|---|---|
| Acid Red 52 | 0.3% |
| Direct Yellow 132 | 0.25% |
| Direct Blue 199 | 0.05 |
| Glycerin | 7.5% |
| Diethylene glycol | 5.0% |
| Isopropylene glycol | 3.0% |
| Compound of General Formula (II) | 2.0% |
| (A and B: $C_4H_7$, X: $(C_2H_4O)_n$, Y: $(C_2H_4O)_m$, n + m = 10) | |
| Pure water | Balance |

Example II-8

| | |
|---|---|
| Acid Red 52 | 0.4% |
| Direct Blue 199 | 0.16% |
| Thiodiglycol | 10.0% |
| Glycerin | 7.5% |
| Triethylene glycol | 3.0% |
| Compound of General Formula (II) | 2.0% |
| (A and B: $C_4H_7$, X: $(C_2H_4O)_n$, Y: $(C_2H_4O)_m$, n + m = 10) | |
| Pure water | Balance |

Example II-9

| | |
|---|---|
| Acid Red 52 | 0.25% |
| Direct Red 80 | 0.05% |
| Direct Yellow 86 | 0.3% |
| Thiodiglycol | 10.0% |
| Glycerin | 7.5% |
| Compound of General Formula (II) | 2.0% |
| (A and B: $C_4H_7$, X: $(C_2H_4O)_n$, Y: $(C_2H_4O)_m$, n + m = 10) | |
| Pure water | Balance |

Example II-10

| | |
|---|---|
| Acid Red 52 | 0.25% |
| Direct Red 80 | 0.05% |
| Exemplified Dye 1 | 0.3% |
| Thiodiglycol | 10.0% |
| Glycerin | 7.5% |
| Triethylene glycol | 3.0% |
| Compound of General Formula (II) | 1.5% |
| (A and B: $C_4H_7$, X: $(C_2H_4O)_n$, Y: $(C_2H_4O)_m$, n + m = 10) | |
| Pure water | Balance |

Example II-11

| | |
|---|---|
| Acid Red 52 | 0.25% |
| Direct Red 80 | 0.1% |
| Exemplified Dye 2 | 0.3% |
| Ethylene glycol | 8.0% |
| Glycerin | 6.0% |
| Triethylene glycol | 3.0% |
| Ethanol | 5.0% |
| Compound of General Formula (II) | 1.5% |
| (A and B: $C_4H_7$, X: $(C_2H_4O)_n$, Y: $(C_2H_4O)_m$, n + m = 10) | |
| Pure water | Balance |

Example II-12

| | |
|---|---|
| Acid Red 52 | 0.3% |
| Direct Yellow 132 | 0.25% |
| Direct Red 80 | 0.05% |
| Glycerin | 7.5% |
| Diethylene glycol | 5.0% |
| Isopropylene glycol | 3.0% |
| Compound of General Formula (II) | 1.5% |
| (A and B: $C_4H_7$, X: $(C_2H_4O)_n$, Y: $(C_2H_4O)_m$, n + m = 10) | |
| Pure water | Balance |

Example II-13

| | |
|---|---|
| Acid Red 52 | 0.4% |
| Direct Yellow 142 | 0.16% |
| Thiodiglycol | 10.0% |
| Glycerin | 7.5% |
| Triethylene glycol | 3.0% |
| Compound of General Formula (II) | 2.5% |
| (A and B: $C_4H_7$, X: $(C_2H_4O)_n$, Y: $(C_2H_4O)_m$, n + m = 10) | |
| Pure water | Balance |

Example II-14

| | |
|---|---|
| Acid Red 52 | 0.1% |
| Exemplified Dye 1 | 0.15% |
| Thiodiglycol | 10.0% |
| Glycerin | 7.5% |

-continued

| | |
|---|---|
| Compound of General Formula (II) | 2.0% |
| (A and B: $C_4H_7$, X: $(C_2H_4O)_n$, Y: $(C_2H_4O)_m$, n + m = 10) | |
| Compound of General Formula (II) | 0.1% |
| (A and B: $C_4H_7$, X: $(C_2H_4O)_n$, Y: $(C_2H_4O)_m$, n + m = 5) | |
| Pure water | Balance |

Example II-15

| | |
|---|---|
| Acid Red 52 | 0.2% |
| Exemplified Dye 3 | 0.3% |
| 2-Pyrrolidone | 7.0% |
| Ethanol | 5.0% |
| Urea | 7.0% |
| Compound of General Formula (II) | 2.0% |
| (A and B: $C_4H_7$, X: $(C_2H_4O)_n$, Y: $(C_2H_4O)_m$, n + m = 10) | |
| Pure water | Balance |

Example II-16

| | |
|---|---|
| Acid Red 52 | 0.25% |
| Exemplified Dye 1 | 0.1% |
| Exemplified Dye 2 | 0.05% |
| Glycerin | 7.5% |
| Diethylene glycol | 5.0% |
| Isopropylene glycol | 3.0% |
| Compound of General Formula (II) | 2.5% |
| (A and B: $C_4H_7$, X: $(C_2H_4O)_n$, Y: $(C_2H_4O)_m$, n + m = 10) | |
| Pure water | Balance |

Example II-17

| | |
|---|---|
| Acid Red 52 | 0.25% |
| Exemplified Dye 1 | 0.3% |
| Thiodiglycol | 10.0% |
| Glycerin | 7.5% |
| Compound of General Formula (II) | 1.5% |
| (A and B: $C_4H_7$, X: $(C_2H_4O)_n$, Y: $(C_2H_4O)_m$, n + m = 10) | |
| Pure water | Balance |

Example II-18

| | |
|---|---|
| Acid Red 52 | 0.25% |
| Exemplified Dye 2 | 0.35% |
| Thiodiglycol | 10.0% |
| Glycerin | 7.5% |
| Triethylene glycol | 3.0% |
| Compound of General Formula (II) | 2.0% |
| (A and B: $C_4H_7$, X: $(C_2H_4O)_n$, Y: $(C_2H_4O)_m$, n + m = 10) | |
| Pure water | Balance |

Example II-19

| | |
|---|---|
| Acid Red 52 | 0.25% |
| Exemplified Dye 5 | 0.4% |
| Ethylene glycol | 8.0% |
| Glycerin | 6.0% |
| Triethylene glycol | 3.0% |
| Ethanol | 5.0% |
| Compound of General Formula (II) | 1.5% |
| (A and B: $C_4H_7$, X: $(C_2H_4O)_n$, Y: $(C_2H_4O)_m$, n + m = 10) | |
| Pure water | Balance |

Example II-20

| | |
|---|---|
| Acid Red 52 | 0.3% |
| Exemplified Dye 1 | 0.1% |
| Exemplified Dye 2 | 0.1% |
| Exemplified Dye 7 | 0.1 |
| Glycerin | 7.5% |
| Diethylene glycol | 5.0% |
| Isopropylene glycol | 3.0% |
| Compound of General Formula (II) | 2.0% |
| (A and B: $C_4H_7$, X: $(C_2H_4O)_n$, Y: $(C_2H_4O)_m$, n + m = 10) | |
| Pure water | Balance |

Example II-21

| | |
|---|---|
| Acid Red 52 | 0.4% |
| Exemplified Dye 2 | 0.16% |
| Thiodiglycol | 10.0% |
| Glycerin | 7.5% |
| Triethylene glycol | 3.0% |
| Compound of General Formula (II) | 1.5% |
| (A and B: $C_4H_7$, X: $(C_2H_4O)_n$, Y: $(C_2H_4O)_m$, n + m = 10) | |
| Pure water | Balance |

TABLE 5

COLORING MATERIAL COMPOSITION OF THE INK IN EXAMPLES

| Example No. | C.I. Acid Red 52 (wt %) (A) | Supplementary coloring material Type | Content (wt %) (B) | Ratio of (B):(A) |
|---|---|---|---|---|
| II-1 | 0.1 | Direct Yellow 142 | 0.15 | 1.5 |
| II-2 | 0.2 | Direct Red 227 | 0.3 | 1.5 |
| II-3 | 0.25 | Direct Red 80 & | 0.1 | 0.6 |
| | | Direct Yellow 86 | 0.05 | |
| II-4 | 0.25 | Direct Red 80 & | 0.15 | 1.2 |
| | | Direct Yellow 86 | 0.15 | |
| II-5 | 0.25 | Direct Red 227 | 0.35 | 1.4 |
| II-6 | 0.25 | Direct Red 227 | 0.4 | 1.6 |
| II-7 | 0.3 | Direct Yellow 132 & | 0.25 | 1.0 |
| | | Direct Blue 199 | 0.05 | |
| II-8 | 0.4 | Direct Blue 199 | 0.16 | 0.4 |
| II-9 | 0.25 | Direct Red 80 & | 0.05 | 1.4 |
| | | Direct Yellow 86 | 0.3 | |
| II-10 | 0.25 | Direct Red 80 & | 0.05 | 1.4 |
| | | Exemplified Dye 1 | 0.3 | |
| II-11 | 0.25 | Direct Red 80 & | 0.1 | 1.6 |
| | | Exemplified Dye 2 | 0.3 | |

TABLE 5-continued

COLORING MATERIAL COMPOSITION OF THE INK IN EXAMPLES

| Example No. | C.I. Acid Red 52 (wt %) (A) | Supplementary coloring material Type | Content (wt %) (B) | Ratio of (B):(A) |
|---|---|---|---|---|
| II-12 | 0.3 | Direct Yellow 132 & Direct Red 80 | 0.25 0.05 | 1.0 |
| II-13 | 0.4 | Direct Yellow 142 | 0.16 | 0.4 |
| II-14 | 0.1 | Exemplified Dye 1 | 0.15 | 1.5 |
| II-15 | 0.2 | Exemplified Dye 3 | 0.3 | 1.5 |
| II-16 | 0.25 | Exemplified Dye 1 & Exemplified Dye 2 | 0.1 0.05 | 0.6 |
| II-17 | 0.25 | Exemplified Dye 1 | 0.3 | 1.2 |
| II-18 | 0.25 | Exemplified Dye 2 | 0.35 | 1.4 |
| II-19 | 0.25 | Exemplified Dye 5 | 0.4 | 1.6 |
| II-20 | 0.3 | Exemplified Dye 1 Exemplified Dye 2 Exemplified Dye 7 & | 0.1 0.1 0.1 | 1.0 |
| II-21 | 0.4 | Exemplified Dye 2 | 0.16 | 0.4 |

Comparative Example II-1 to II-21

The printing was conducted in the same manner as in Comparative Examples I-1 to I-9, and I-11 to 1–21, and the evaluation was made as below.

(Evaluation 1: Water Resistance)

The water resistance was evaluated in the same manner as in Examples I-1 to 1–21 and Comparative Examples I-1 to I-21.

(Evaluation 2: Fluorescence Intensity)

The fluorescence intensity was measured in the same manner as in Examples I-1 to I-21 and Comparative Examples I-1 to I-21 except that the excitation wavelength was changed to 254 nm. Presuming higher fluorescence intensity in Examples II, the evaluation standard was changed to meet higher fluorescence intensity in comparison with the intensities in Examples I.

A: The normalized intensity is 120 or higher.
B: The normalized intensity ranges from 119 to 101.
C: The normalized intensity ranges from 100 to 80.
D: The normalized intensity is 79 or lower.

| Example No. | Water resistance | Fluorescence intensity | Comparative Example No. | Water resistance | Fluorescence intensity |
|---|---|---|---|---|---|
| II-1 | B | B | II-1 | D | — |
| II-2 | B | B | II-2 | D | D |
| II-3 | B | A | II-3 | D | D |
| II-4 | B | A | II-4 | B | D |
| II-5 | B | A | II-5 | C | C |
| II-6 | B | B | II-6 | A | D |
| II-7 | B | A | II-7 | B | D |
| II-8 | B | B | II-8 | A | D |
| II-9 | B | A | II-9 | C | D |
| II-10 | A | A | II-10 | A | D |
| II-11 | A | B | II-II | B | D |
| II-12 | B | A | II-12 | B | D |
| II-13 | B | B | II-13 | C | C |
| II-14 | B | B | II-14 | A | D |
| II-15 | A | A | II-15 | A | D |
| II-16 | B | A | II-16 | A | D |
| II-17 | A | A | II-17 | A | D |
| II-18 | A | A | II-18 | A | D |
| II-19 | A | B | II-19 | A | D |
| II-20 | A | A | II-20 | C | C |
| II-21 | B | B | — | — | — |

As described above, the present invention provides a red fluorescent ink capable of forming prints with high water resistance, high fluorescence intensity, and excellent color tone. The present invention provides also an ink unit, and an ink cartridge holding this ink. The present invention further provides a ink-jet recording method and an ink-jet recording apparatus employing the ink unit or the ink cartridge to give water-resistant fluorescent prints.

What is claimed is:

1. A recording unit, comprising:
   an ink container containing a fluorescent ink; and
   a head for ejecting the ink;
   wherein said fluorescent ink contains at least a coloring material and an aqueous liquid medium for dissolving the coloring material; and
   wherein the coloring material comprises C.I. Acid Red 52 and at least one direct dye, the content of the C.I. Acid Red 52 ranging from 0.1 to 0.4% by weight based on the total amount of the ink, the content of the direct dye ranging from 0.11 to 0.4% by weight based on the total amount of the ink, and the weight ratio of the direct dye to the C.I. Acid Red 52 being not higher than 1.6.

2. The recording unit according to claim 1, wherein the head has such a constitution as to eject the ink by applying thermal energy to the ink.

3. The recording unit according to claim 1, wherein the ink container comprises polyolefins.

4. The recording unit according to claim 3, wherein the ink container has an ink-holding member therein.

5. The recording unit according to claim 4, wherein the ink-holding member comprises at least one material selected from the group consisting of polyurethanes, cellulose, polyvinyl acetate, and polyolefins.

6. The recording unit according to claim 4, wherein the ink-holding member is constituted of a polymer of an inorganic compound.

7. The recording unit according to claim 4, wherein the ink-holding member is a porous material.

8. The recording unit according to claim 7, wherein the ink-holding member has a face being in contact with the ink container.

9. The recording unit according to claim 4, wherein the ink-holding member has a multiple layer structure.

10. The recording unit according to claim 9, wherein the direction of the multi-layer arrangement of the multi-layer structure is aligned in an ink discharging direction of the ink container.

11. The recording unit according to claim 10, wherein the ink-holding member has a face being in contact with the ink container.

12. The recording unit according to claim 4, wherein the ink-holding member is a fiber flocculate.

13. The recording unit according to claim 12, wherein the fiber flocculate is aligned in an ink discharging direction of the ink container.

14. The recording unit according to claim 13, wherein the ink-holding member has a face being in contact with the ink container.

15. An ink cartridge comprising:
   an ink container containing a fluorescent ink, wherein said fluorescent ink contains at least a coloring material and an aqueous liquid medium for dissolving the coloring material, and wherein the coloring material comprises C.I. Acid Red 52 and at least one direct dye, the content of the C.I. Acid Red 52 ranging from 0.1 to 0.4% by weight based on the total amount of the ink, the content of the direct dye ranging from 0.11 to 0.4% by weight based on the total amount of the ink, and the weight ratio of the direct dye to the C.I. Acid Red 52 being not higher than 1.6.

16. The ink cartridge according to claim 15, wherein the ink container comprises polyolefins.

17. The ink cartridge according to claim 16, wherein the ink container has an ink-holding member therein.

18. The ink cartridge according to claim 17, wherein the ink-holding member comprises at least one material selected from the group consisting of polyurethanes, cellulose, polyvinyl acetate, and polyolefins.

19. The ink cartridge according to claim 17, wherein the ink-holding member is constituted of a polymer of an inorganic compound.

20. The ink cartridge according to claim 17, wherein the ink-holding member is a porous material.

21. The ink cartridge according to claim 19, wherein the ink-holding member has a face in contact with the ink container.

22. The ink cartridge according to claim 15, wherein the ink-holding member has a multi-layer structure.

23. The ink cartridge according to claim 22, wherein the direction of the multi-layer arrangement of the multi-layer structure is aligned in an ink discharging direction of the ink container.

24. The ink cartridge according to claim 23, wherein the ink-holding member has a face in contact with the ink container.

25. The ink cartridge according to claim 17, wherein the ink-holding member is a fiber flocculate.

26. The ink cartridge according to claim 25, wherein the fiber flocculate is aligned in an ink discharging a direction of the ink container.

27. The ink cartridge according to claim 26, wherein the ink-holding member has a face being in contact with the ink container.

28. An ink-jet recording method comprising a step of ejecting a fluorescent ink by application of an energy to the ink, wherein said fluorescent ink contains at least a coloring material and an aqueous liquid medium for dissolving the coloring material, and wherein the coloring material comprises C.I. Acid Red 52 and at least one direct dye, the content of the C.I. Acid Red 52 ranging from 0.1 to 0.4% by weight based on the total amount of the ink, the content of the direct dye ranging from 0.11 to 0.4% by weight based on the total amount of the ink, and the weight ratio of the direct dye to the C.I. Acid Red 52 being not higher than 1.6.

29. The ink-jet recording method according to claim 28, wherein the energy is a thermal energy.

30. An ink-jet recording apparatus comprising:
an ink container containing a fluorescent ink; and
a recording head for ejecting the ink, wherein said fluorescent ink contains at least a coloring material and an aqueous liquid medium for dissolving the coloring material, and wherein the coloring material comprises C.I. Acid Red 52 and at least one direct dye, the content of the C.I. Acid Red 52 ranging from 0.1 to 0.4% by weight based on the total amount of the ink, the content of the direct dye ranging from 0.11 to 0.4% by weight based on the total amount of the ink, and the weight ratio of the direct dye to the C.I. Acid Red 52 being not higher than 1.6.

31. The ink-jet recording apparatus according to claim 30, wherein the recording head has a heater for applying the thermal energy to the ink for ejecting the ink.

32. A recording unit according to claim 1, wherein the direct dye has two or more azo groups in the dye molecule.

33. A recording unit according to claim 32, wherein the direct dye has a dimer structure.

34. A recording unit according to claim 1, wherein the direct dye has a color tone, in L*a*b color space, of a* ranging from −20 to 60, b* ranging from −5 to 60, and of $\sqrt{(a^2+b^2)}$ of 30 or more.

35. A recording unit according to claim 32, wherein the direct dye, in a free acid state, is represented by General Formula (I) below:

$$Ar-N=N-J-N(R^1)-X-\left[N(L)-R^2 \atop N-R^3\right] \atop Ar^1-N=N-J^1-N(R^4)-X\bigg]_n \quad (I)$$

where Ar and $Ar^1$ are respectively a substituted or unsubstituted aryl group, and at least one of Ar and $Ar^1$ has a substituent selected from COOH and COSH; J and $J^1$ are respectively a group selected from the following General Formulas (1), (2), and (3):

(1) [phenyl ring with $R^5$ substituent]

(2) [pyridone structure with T, W, HO, (m), O substituents]

(3) [pyrazole structure with B, HO, methyl substituents and phenyl group]

(In General Formula (1), $R^5$ is independently selected from H, alkyls, substituted alkyls, alkoxys, halogens, CN, ureido, and $NHCOR^6$; $R^6$ being selected from H, alkyls, substituted alkyls, aryls, substituted aryls, aralkyls, and substituted aralkyls, in General Formula (2), T is an alkyl; W is selected from H, CN, $CONR^{10}R^{11}$, pyridium, and COOH; (m) is an alkylene chain of 2–8 carbon atoms; $R^{10}$ and $R^{11}$ are each selected from H, alkyls, and substituted alkyls, in General Formula (3), B is selected from H, and alkyls, and COOH.); and in General Formula (I), $R^1$ $R^2$, $R^3$, and $R^4$ are respectively selected from H, alkyls, and substituted alkyls; L is a divalent organic bonding group; n is an integer of 0 or 1; X is a carbonyl, or one of General Formulas (4), (5), and (6):

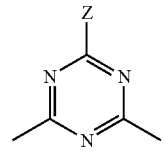
(4)

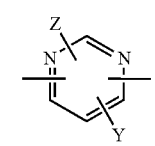
(5)

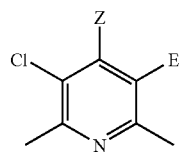
(6)

(In General Formulas (4)–(6), Z is selected from $OR^7$, $SR^7$, and $NR^8R^9$; Y is selected from H, Cl, CN, and Z; E is selected from Cl and CN; $R^7$, $R^8$, and $R^9$ are respectively selected from H, alkenyls, substituted alkenyls, alkyls, substituted alkyls, aryls, substituted aryls, aralkyls, and substituted aralkyls; and $R^8$ and $R^9$ may form a five-membered or six-membered ring together with the nitrogen atom bonding therewith.); and the dye of General Formula (I) which does not have an $SO_3H$ group has at least two groups selected from a COOH group and a COSH group, and the dye of General Formula (I) which has one or more $SO_3H$ groups has groups selected from a COOH group and a COSH group at least in the same number as the number of $SO_3H$.

36. A recording unit according to claim 1, wherein the aqueous liquid medium contains water.

37. A recording unit according to claim 36, wherein the water is contained at a content ranging from 10 to 95% by weight based on the total weight of the ink.

38. A recording unit according to claim 1, wherein the aqueous liquid medium contains a water-soluble organic solvent.

39. A recording unit according to claim 38, wherein the water-soluble organic solvent is contained at a content of not more than 50% by weight based on the total weight of the ink.

40. A recording unit according to claim 1, wherein the ink contains additionally a first organic compound and a second organic compound incompatible with each other, the first organic compound and the second organic compound being soluble or dispersible in the aqueous liquid medium.

41. A recording unit according to claim 40, wherein the first organic compound and the second organic compound are capable of dissolving or dispersing C.I. Acid Red 52 and the direct dye.

42. A recording unit according to claim 40, wherein one of the first organic compound and the second organic compound has a solubility parameter of not less than 15, and the other thereof has a solubility parameter of not more than 13.

43. A recording unit according to claim 40, wherein the first organic compound and the second organic compound are respectively a nonpolar compound.

44. A recording unit according to claim 40, wherein the first organic compound and the second organic compound are both water-soluble.

45. A recording unit according to claim 40, wherein the first organic compound and the second organic compound are both liquid.

46. A recording unit according to claim 40, wherein one of the first organic compound and the second organic compound has a glycerin group.

47. A recording unit according to claim 46, wherein the organic compound having the glycerin group has three or more hydroxyl groups.

48. A recording unit according to claim 40, wherein the first organic compound and the second organic compound are both liquid at an ordinary temperature.

49. A recording unit according to claim 40, wherein one of the first organic compound and the second organic compound is a nonionic surfactant.

50. A recording unit according to claim 49, wherein the nonionic surfactant is liquid at an ordinary temperature.

51. A recording unit according to claim 49, wherein the nonionic surfactant has an HLB value of not more than 13.

52. A recording unit according to claim 51, wherein the nonionic surfactant is contained in the ink in an amount not to cause separation at an interface portion of the liquid medium which is obtained by removing a coloring material from the ink.

53. A recording unit according to claim 49, wherein the nonionic surfactant has an acetylene group.

54. A recording unit according to claim 53, wherein the nonionic surfactant has a structure represented by the following General Formula (II):

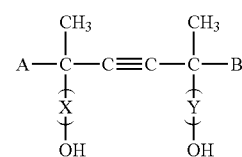
(II)

wherein A and B are independently $C_nH_{2n+1}$ (n is an integer of 1 to 10), and X and Y are an open-ring ethylene oxide unit and/or an open-ring propylene oxide unit.

55. A recording unit according to claim 49, wherein the nonionic surfactant is contained at a content of not lower than 1% by weight based on the total weight of the ink.

56. A recording unit according to claim 40, further containing a monohydric alcohols.

57. A recording unit according to claim 40, wherein the counter ion of the hydrophilic group of the direct dye is ammonia.

58. A recording unit according to claim 40, further containing at least one compound selected from the group consisting of urea and urea derivatives.

59. A recording unit according to claim 58, wherein the urea derivative is not an acyclic compound.

60. A recording unit according to claim 58, wherein the urea derivative is at least one selected from the group consisting of alkyl derivatives of urea, and ethylene-oxide and/or propylene-oxide adducts of urea.

61. A recording unit according to claim 40, wherein the coloring materials of the ink has two counter ions, one of which is an ammonium ion and the other is an alkali metal ion.

62. A recording unit according to claim 40, wherein the fluorescent ink has a maximum wavelength for excitation and a fluorescence maximum wavelength and the maximum wavelength for excitation is shorter than the fluorescence maximum wavelength.

63. A recording unit according to claim 1, wherein the ink has a surface tension of not more than 40 mN/m (dyn/cm).

64. A recording unit according to claim 1, wherein the ink has pH of not lower than 8.

65. An ink cartridge according to claim 15, wherein the direct dye has two or more azo groups in the dye molecule.

66. An ink cartridge according to claim 65, wherein the direct dye has a dimer structure.

67. An ink cartridge according to claim 15, wherein the direct dye has a color tone, in L*a*b* color space, of a* ranging from −20 to 60, b* ranging from −5 to 60, and of $\sqrt{(a^2+b^2)}$ of 30 or more.

68. An ink cartridge according to claim 65, wherein the direct dye, in a free acid state, is represented by General Formula (I) below:

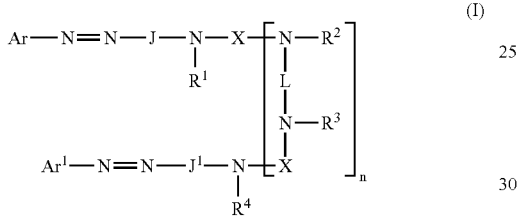

where Ar and $Ar^1$ are respectively a substituted or unsubstituted aryl group, and at least one of Ar and $Ar^1$ has a substituent selected from COOH and COSH; J and $J^1$ are respectively a group selected from the following General Formulas (1), (2), and (3):

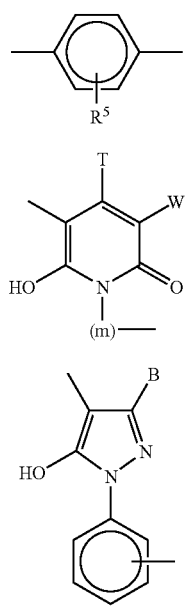

(In General Formula (1), $R^5$ is independently selected from H, alkyls, substituted alkyls, alkoxys, halogens, CN, ureido, and $NHCOR^6$; $R^6$ being selected from H, alkyls, substituted alkyls, aryls, substituted aryls, aralkyls, and substituted aralkyls, in General Formula (2), T is an alkyl; W is selected from H, CN, $CONR^{10}R^{11}$, pyridium, and COOH; (m) is an alkylene chain of 2–8 carbon atoms; $R^{10}$ and $R^{11}$ are each selected from H, alkyls, and substituted alkyls, in General Formula (3), B is selected from H, and alkyls, and COOH.); and in General Formula (I), $R^1$ $R^2$, $R^3$, and $R^4$ are respectively selected from H, alkyls, and substituted alkyls; L is a divalent organic bonding group; n is an integer of 0 or 1; X is a carbonyl, or one of General Formulas (4), (5), and (6):

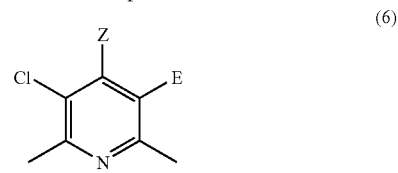

(In General Formulas (4)–(6), Z is selected from $OR^7$, $SR^7$, and $NR^8R^9$; Y is selected from H, Cl, CN, and Z; E is selected from Cl and CN; $R^7$, $R^8$, and $R^9$ are respectively selected from H, alkenyls, substituted alkenyls, alkyls, substituted alkyls, aryls, substituted aryls, aralkyls, and substituted aralkyls; and $R^8$ and $R^9$ may form a five-membered or six-membered ring together with the nitrogen atom bonding therewith.); and the dye of General Formula (I) which does not have an $SO_3H$ group has at least two groups selected from a COOH group and a COSH group, and the dye of General Formula (D which has one or more $SO_3H$ groups has groups selected from a COOH group and a COSH group at least in the same number as the number of $SO_3H$.

69. An ink cartridge according to claim 15, wherein the aqueous liquid medium contains water.

70. An ink cartridge according to claim 69, wherein the water is contained at a content ranging from 10 to 95% by weight based on the total weight of the ink.

71. An ink cartridge according to claim 15, wherein the aqueous liquid medium contains a water-soluble organic solvent.

72. An ink cartridge according to claim 71, wherein the water-soluable organic solvent is contained at a content of not more than 50% by weight based on the total weight of the ink.

73. An ink cartridge according to claim 15, wherein the ink contains additionally a first organic compound and a second organic compound incompatible with each other, the first organic compound and the second organic compound being soluble or dispersible in the aqueous liquid medium.

74. An ink cartridge according to claim 73, wherein the first organic compound and the second organic compound are capable of dissolving or dispersing C. I. Acid Red 52 and the direct dye.

75. An ink cartridge according to claim 73, wherein one of the first organic compound and the second organic compound has a solubility parameter of not less than 15, and the other thereof has a solubility parameter of not more than 13.

76. An ink cartridge according to claim 73, wherein the first organic compound and the second organic compound are respectively a nonpolar compound.

77. An ink cartridge according to claim 73, wherein the first organic compound and the second organic compound are both water-soluble.

78. An ink cartridge according to claim 73, wherein the first organic compound and the second organic compound are both liquid.

79. An ink cartridge according to claim 73, wherein one of the first organic compound and the second organic compound has a glycerin group.

80. An ink cartridge according to claim 79, wherein the organic compound having the glycerin group has three or more hydroxyl groups.

81. An ink cartridge according to claim 73, wherein the first organic compound and the second organic compound are both liquid at an ordinary temperature.

82. An ink cartridge according to claim 73, wherein one of the first organic compound and the second organic compound is a nonionic surfactant.

83. An ink cartridge according to claim 82, wherein the nonionic surfactant is liquid at an ordinary temperature.

84. An ink cartridge according to claim 82, wherein the nonionic surfactant has an HLB value of not more than 13.

85. An ink cartridge according to claim 84, wherein the nonionic surfactant is contained in the ink in an amount not to cause separation at an interface portion of the liquid medium which is obtained by removing a coloring material from the ink.

86. An ink cartridge according to claim 82, wherein the nonionic surfactant has an acetylene group.

87. An ink cartridge according to claim 86, wherein the nonionic surfactant has a structure represented by the following General Formula (II):

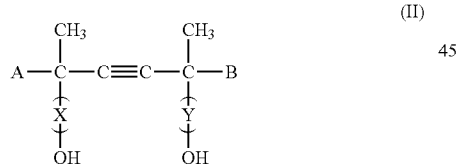

wherein A and B are independently $C_nH_{2n+1}$ (n is an integer of 1 to 10), and X and Y are an open-ring ethylene oxide unit and or an open-ring propylene oxide unit.

88. An ink cartridge according to claim 82, wherein the nonionic surfactant is contained at a content of not lower than 1% by weight based on the total weight of the ink.

89. An ink cartridge according to claim 73, further containing a monohydric alcohols.

90. An ink cartridge according to claim 73, wherein the counter ion of the hydrophilic group of the direct dye is ammonia.

91. An ink cartridge according to claim 73, further containing at least one compound selected from the group consisting of urea and urea derivatives.

92. An ink cartridge according to claim 91, wherein the urea derivative is not an acyclic compound.

93. An ink cartridge according to claim 91, wherein the urea derivative is at least one selected from the group consisting of alkyl derivatives of urea, and ethylene-oxide and/or propylene-oxide adducts of urea.

94. An ink cartridge according to claim 73, wherein the coloring materials of the ink has two counter ions, one of which is an ammonium ion and the other is an alkali metal ion.

95. An ink cartridge according to claim 73, wherein the fluorescent ink has a maximum wavelength for excitation and a fluorescence maximum wavelength and the maximum wavelength for excitation is shorter than the fluorescence maximum wavelength.

96. An ink cartridge according to claim 15, wherein the ink has a surface tension of not more than 40 mN/m (dyn/cm).

97. An ink cartridge according to claim 15, wherein the ink has pH of not lower than 8.

98. An ink-jet recording method according to claim 28, wherein the direct dye has two or more azo groups in the dye molecule.

99. An ink-jet recording method according to claim 98, wherein the direct dye has a dimer structure.

100. An ink-jet recording method according to claim 28, wherein the direct dye has a color tone, in L*a*b* color space, of a* ranging from −20 to 60, b* ranging from −5 to 60, and of $\sqrt{(a^2+b^2)}$ of 30 or more.

101. An ink-jet recording method according to claim 98, wherein the direct dye, in a free acid state, is represented by General Formula (I) below:

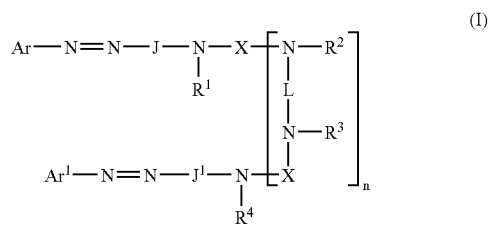

where Ar and $Ar^1$ are respectively a substituted or unsubstituted aryl group, and at least one of Ar and $Ar^1$ has a substituent selected from COOH and COSH; J and $J^1$ are respectively a group selected from the following General Formulas (1), (2), and (3):

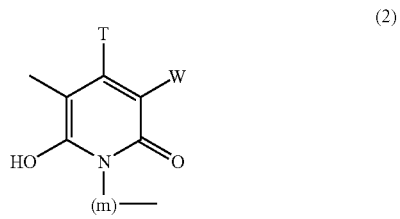

-continued

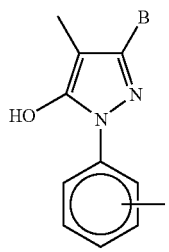
(3)

(In General Formula (1), $R^5$ is independently selected from H, alkyls, substituted alkyls, alkoxys, halogens, CN, ureido, and $NHCOR^6$; $R^6$ being selected from H, alkyls, substituted alkyls, aryls, substituted aryls, aralkyls, and substituted aralkyls, in General Formula (2), T is an alkyl; W is selected from H, CN, $CONR^{10}R^{11}$, pyridium, and COOH; (m) is an alkylene chain of 2–8 carbon atoms; $R^{10}$ and $R^{11}$ are each selected from H, alkyls, and substituted alkyls, in General Formula (3), B is selected from H, and alkyls, and COOH.); and in General Formula (I), $R^1$ $R^2$, $R^3$, and $R^4$ are respectively selected from H, alkyls, and substituted alkyls; L is a divalent organic bonding group; n is an integer of 0 or 1; X is a carbonyl, or one of General Formulas (4), (5), and (6):

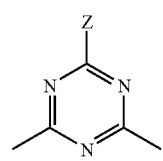
(4)

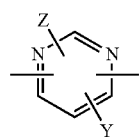
(5)

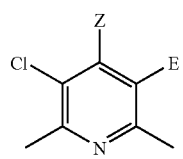
(6)

(In General Formulas (4)–(6), Z is selected from $OR^7$, $SR^7$, and $NR^8R^9$; Y is selected from H, Cl, CN, and Z; E is selected from Cl and CN; $R^7$, $R^8$, and $R^9$ are respectively selected from H, alkenyls, substituted alkenyls, alkyls, substituted alkyls, aryls, substituted aryls, aralkyls, and substituted aralkyls; and $R^8$ and $R^9$ may form a five-membered or six-membered ring together with the nitrogen atom bonding therewith.); and the dye of General Formula (I) which does not have an $SO_3H$ group has at least two groups selected from a COOH group and a COSH group, and the dye of General Formula (I) which has one or more $SO_3H$ groups has groups selected from a COOH group and a COSH group at least in the same number as the number of $SO_3H$.

102. An ink-jet recording method according to claim 28, wherein the aqueous liquid medium contains water.

103. An ink-jet recording method according to claim 102, wherein the water is contained at a content ranging from 10 to 95% by weight based on the total weight of the ink.

104. An ink-jet recording method according to claim 28, wherein the aqueous liquid medium contains a water-soluble organic solvent.

105. An ink-jet recording method according to claim 104, wherein the water-soluble organic solvent is contained at a content of not more than 50% by weight based on the total weight of the ink.

106. An ink-jet recording method according to claim 28, wherein the ink contains additionally a first organic compound and a second organic compound incompatible with each other, the first organic compound and the second organic compound being soluble or dispersible in the aqueous liquid medium.

107. An ink-jet recording method according to claim 106, wherein the first organic compound and the second organic compound are capable of dissolving or dispersing C.I. Acid Red 52 and the direct dye.

108. An ink-jet recording method according to claim 106, wherein one of the first organic compound and the second organic compound has a solubility parameter of not less than 15, and the other thereof has a solubility parameter of not more than 13.

109. An ink-jet recording method according to claim 106, wherein the first organic compound and the second organic compound are respectively a nonpolar compound.

110. An ink-jet recording method according to claim 106, wherein the first organic compound and the second organic compound are both water-soluble.

111. An ink-jet recording method according to claim 106, wherein the first organic compound and the second organic compound are both liquid.

112. An ink-jet recording method according to claim 106, wherein one of the first organic compound and the second organic compound has a glycerin group.

113. An ink-jet recording method according to claim 112, wherein the organic compound having the glycerin group has three or more hydroxyl groups.

114. An ink-jet recording method according to claim 106, wherein the first organic compound and the second organic compound are both liquid at an ordinary temperature.

115. An ink-jet recording method according to claim 106, wherein one of the first organic compound and the second organic compound is a nonionic surfactant.

116. An ink-jet recording method according to claim 115, wherein the nonionic surfactant is liquid at an ordinary temperature.

117. An ink-jet recording method according to claim 115, wherein the nonionic surfactant has an HLB value of not more than 13.

118. An ink-jet recording method according to claim 117, wherein the nonionic surfactant is contained in the ink in an amount not to cause separation at an interface portion of the liquid medium which is obtained by removing a coloring material from the ink.

119. An ink-jet recording method according to claim 115, wherein the nonionic surfactant has an acetylene group.

120. An ink-jet recording method according to claim 119, wherein the nonionic surfactant has a structure represented by the following General Formula (II):

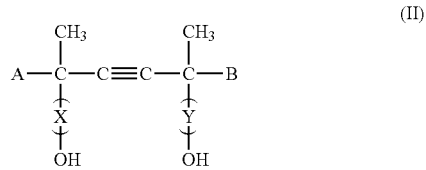
(II)

wherein A and B are independently $C_nH_{2n+1}$ (n is an integer of 1 to 10), and X and Y are an open-ring ethylene oxide unit and/or an open-ring propylene oxide unit.

121. An ink-jet recording method according to claim 115, wherein the nonionic surfactant is contained at a content of not lower than 1% by weight based on the total weight of the ink.

122. An ink-jet recording method according to claim 106, further containing a monohydric alcohols.

123. An ink-jet recording method according to claim 106, wherein the counter ion of the hydrophilic group of the direct dye is ammonia.

124. An ink-jet recording method according to claim 106, further containing at least one compound selected from the group consisting of urea and urea derivatives.

125. An ink-jet recording method according to claim 119, wherein the urea derivative is not an acyclic compound.

126. An ink-jet recording method according to claim 119, wherein the urea derivative is at least one selected from the group consisting of alkyl derivatives of urea, and ethylene-oxide and/or propylene-oxide adducts of urea.

127. An ink-jet recording method according to claim 86, wherein the coloring materials of the ink has two counter ions, one of which is an ammonium ion and the other is an alkali metal ion.

128. An ink-jet recording method according to claim 86, wherein the fluorescent ink has a maximum wavelength for excitation and a fluorescence maximum wavelength and the maximum wavelength for excitation is shorter than the fluorescence maximum wavelength.

129. An ink-jet recording method according to claim 28, wherein the ink has a surface tension of not more than 40 mN/m (dyn/cm).

130. An ink-jet recording method according to claim 28, wherein the ink has pH of not lower than 8.

131. An ink-jet recording apparatus according to claim 30, wherein the direct dye has two or more azo groups in the dye molecule.

132. An ink-jet recording apparatus according to claim 131, wherein the direct dye has a dimer structure.

133. An ink-jet recording apparatus according to claim 30, wherein the direct dye has a color tone, in L*a*b* color space, of a* ranging from −20 to 60, b* ranging from −5 to 60, and of $\sqrt{(a^2+b^2)}$ of 30 or more.

134. An ink-jet recording apparatus according to claim 131, wherein the direct dye, in a free acid state, is represented by General Formula (I) below:

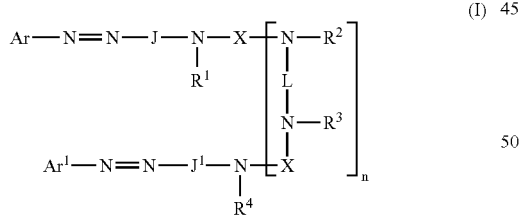

(I)

where Ar and Ar$^1$ are respectively a substituted or unsubstituted aryl group, and at least one of Ar and Ar$^1$ has a substituent selected from COOH and COSH; J and J$^1$ are respectively a group selected from the following General Formulas (1), (2), and (3):

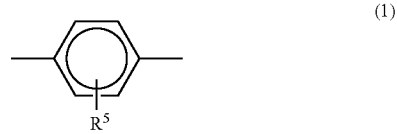

(1)

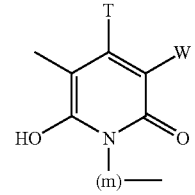

(2)

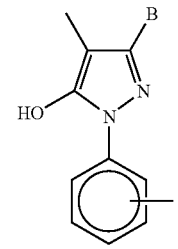

(3)

(In General Formula (1), R$^5$ is independently selected from H, alkyls, substituted alkyls, alkoxys, halogens, CN, ureido, and NHCOR$^6$; R$^6$ being selected from H, alkyls, substituted alkyls, aryls, substituted aryls, aralkyls, and substituted aralkyls, in General Formula (2), T is an alkyl; W is selected from H, CN, CONR$^{10}$R$^{11}$, pyridium, and COOH; (m) is an alkylene chain of 2–8 carbon atoms; R$^{10}$ and R$^{11}$ are each selected from H, alkyls, and substituted alkyls, in General Formula (3), B is selected from H, and alkyls, and COOH.); and in General Formula (I), R$^1$ R$^2$, R$^3$, and R$^4$ are respectively selected from H, alkyls, and substituted alkyls; L is a divalent organic bonding group; n is an integer of 0 or 1, X is a carbonyl, or one of General Formulas (4), (5), and (6):

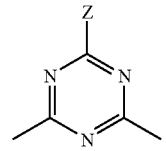

(4)

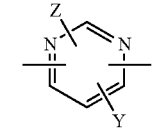

(5)

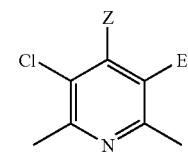

(6)

(In General Formulas (4)–(6), Z is selected from OR$^7$, SR$^7$, and NR$^8$R$^9$; Y is selected from H, Cl, CN, and Z; E is selected from Cl and CN; R$^7$, R$^8$, and R$^9$ are respectively selected from H, alkenyls, substituted alkenyls, alkyls, substituted alkyls, aryls, substituted aryls, aralkyls, and substituted aralkyls; and R$^8$ and R$^9$ may form a five-membered or six-membered ring together with the nitrogen atom bonding therewith.); and the dye of General Formula (I) which does not have an SO$_3$H group has at least two groups selected from a COOH group and a COSH group, and the dye of General Formula (I) which has one or more $SO_3H$ groups has groups selected from a COOH group and a COSH group at least in the same number as the number of $SO_3H$.

135. An ink-jet recording apparatus according to claim 30, wherein the aqueous liquid medium contains water.

136. An ink-jet recording apparatus according to claim 135, wherein the water is contained at a content ranging from 10 to 95% by weight based on the total weight of the ink.

137. An ink-jet recording apparatus according to claim 30, wherein the aqueous liquid medium contains a water-soluble organic solvent.

138. An ink-jet recording apparatus according to claim 137, wherein the water-soluble organic solvent is contained at a content of not more than 50% by weight based on the total weight of the ink.

139. An ink-jet recording apparatus according to claim 30, wherein the ink contains additionally a first organic compound and a second organic compound incompatible with each other, the first organic compound and the second organic compound being soluble or dispersible in the aqueous liquid medium.

140. An ink-jet recording apparatus according to claim 139, wherein the first organic compound and the second organic compound are capable of dissolving or dispersing C.I. Acid Red 52 and the direct dye.

141. An ink-jet recording apparatus according to claim 139, wherein one of the first organic compound and the second organic compound has a solubility parameter of not less than 15, and the other thereof has a solubility parameter of not more than 13.

142. An ink-jet recording apparatus according to claim 139, wherein the first organic compound and the second organic compound are respectively a nonpolar compound.

143. An ink-jet recording apparatus according to claim 139, wherein the first organic compound and the second organic compound are both water-soluble.

144. An ink-jet recording apparatus according to claim 139, wherein the first organic compound and the second organic compound are both liquid.

145. An ink-jet recording apparatus according to claim 139, wherein one of the first organic compound and the second organic compound has a glycerin group.

146. An ink-jet recording apparatus according to claim 145, wherein the organic compound having the glycerin group has three or more hydroxyl groups.

147. An ink-jet recording apparatus according to claim 139, wherein the first organic compound and the second organic compound are both liquid at an ordinary temperature.

148. An ink-jet recording apparatus according to claim 139, wherein one of the first organic compound and the second organic compound is a nonionic surfactant.

149. An ink-jet recording apparatus according to claim 148, wherein the nonionic surfactant is liquid at an ordinary temperature.

150. An ink-jet recording apparatus according to claim 148, wherein the nonionic surfactant has an HLB value of not more than 13.

151. An ink-jet recording apparatus according to claim 150, wherein the nonionic surfactant is contained in the ink in an amount not to cause separation at an interface portion of the liquid medium which is obtained by removing a coloring material from the ink.

152. An ink-jet recording apparatus according to claim 148, wherein the nonionic surfactant has an acetylene group.

153. An ink-jet recording apparatus according to claim 152, wherein the nonionic surfactant has a structure represented by the following General Formula (II):

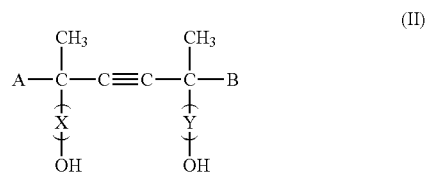

wherein A and B are independently $C_nH_{2n+1}$ (n is an integer of 1 to 10), and X and Y are an open-ring ethylene oxide unit and/or an open-ring propylene oxide unit.

154. An ink-jet recording apparatus according to claim 148, wherein the nonionic surfactant is contained at a content of not lower than 1% by weight based on the total weight of the ink.

155. An ink-jet recording apparatus according to claim 139, further containing a monohydric alcohols.

156. An ink-jet recording apparatus according to claim 139, wherein the counter ion of the hydrophilic group of the direct dye is ammonia.

157. An ink-jet recording apparatus according to claim 139, further containing at least one compound selected from the group consisting of urea and urea derivatives.

158. An ink-jet recording apparatus according to claim 157, wherein the urea derivative is not an acyclic compound.

159. An ink-jet recording apparatus according to claim 157, wherein the urea derivative is at least one selected from the group consisting of alkyl derivatives of urea, and ethylene-oxide and/or propylene-oxide adducts of urea.

160. An ink-jet recording apparatus according to claim 139, wherein the coloring materials of the ink has two counter ions, one of which is an ammonium ion and the other is an alkali metal ion.

161. An ink-jet recording apparatus according to claim 139, wherein the fluorescent ink has a maximum wavelength for excitation and a fluorescence maximum wavelength and the maximum wavelength for excitation is shorter than the fluorescence maximum wavelength.

162. An ink-jet recording apparatus according to claim 30, wherein the ink has a surface tension of not more than 40 mN/m (dyn/cm).

163. An ink-jet recording apparatus according to claim 30, wherein the ink has pH of not lower than 8.

* * * * *

UNITED STATES PATENT AND TRADEMARK OFFICE
CERTIFICATE OF CORRECTION

| | | |
|---|---|---|
| PATENT NO. | : 7,060,123 B2 | Page 1 of 1 |
| APPLICATION NO. | : 10/986006 | |
| DATED | : June 13, 2006 | |
| INVENTOR(S) | : Shinichi Hakamada et al. | |

It is certified that error appears in the above-identified patent and that said Letters Patent is hereby corrected as shown below:

COLUMN 1
      Line 33, "a" should be deleted.

COLUMN 12
      Line 46, "amount" should read --amount of--.

COLUMN 18
      Line 25, "acid" should read --acid)--.

COLUMN 24
      Line 49, "0.05" should read --0.05%--.

COLUMN 38
      Line 23, "0.1" should read --0.1%--.

COLUMN 46
      Line 42, "(D" should read --(I)--.

COLUMN 51
      Line 18, "ink-jet recording method" should read --ink cartridge--; and
      Line 22, "ink-jet recording method" should read --ink cartridge--.

Signed and Sealed this

Second Day of January, 2007

JON W. DUDAS
*Director of the United States Patent and Trademark Office*